(12) United States Patent
Hunt

(10) Patent No.: US 7,312,926 B2
(45) Date of Patent: Dec. 25, 2007

(54) LENTICULAR IMAGE DISPLAY APPARATUS

(75) Inventor: Robert J Hunt, Lisburn (GB)

(73) Assignee: Marketing Works International Limited, Belfast (GB)

( * ) Notice: Subject to any disclaimer, the term of this patent is extended or adjusted under 35 U.S.C. 154(b) by 46 days.

(21) Appl. No.: 10/576,911

(22) PCT Filed: Oct. 22, 2004

(86) PCT No.: PCT/EP2004/012092

§ 371 (c)(1),
(2), (4) Date: Apr. 24, 2006

(87) PCT Pub. No.: WO2005/040913

PCT Pub. Date: May 6, 2005

(65) Prior Publication Data

US 2007/0086089 A1  Apr. 19, 2007

(30) Foreign Application Priority Data

Oct. 25, 2003 (GB) ............................ 0324917.4
Dec. 23, 2003 (GB) ............................ 0329765.2
Jan. 27, 2004 (GB) ............................ 0401765.3

(51) Int. Cl.
G02B 27/10 (2006.01)
G02B 27/22 (2006.01)
G03B 25/02 (2006.01)
G03B 21/60 (2006.01)

(52) U.S. Cl. .................... 359/619; 40/454; 359/455; 359/463

(58) Field of Classification Search .............. 40/454; 345/4; 353/32; 359/455, 463, 619
See application file for complete search history.

(56) References Cited

U.S. PATENT DOCUMENTS 7,210,257 B2 *  5/2007  McKinley .................. 40/453
2004/0027311 A1 *  2/2004  Hunt ............................ 345/4

FOREIGN PATENT DOCUMENTS

WO     WO 01/17637     *  3/2001

* cited by examiner

*Primary Examiner*—David N. Spector
(74) *Attorney, Agent, or Firm*—Van Dyke, Gardner, Linn & Burkhart, LLP

(57) ABSTRACT

An apparatus for displaying a lenticular image comprising a lenticular image sheet and a lenticular lens sheet. The apparatus comprising a housing adapted to receive the lenticular image sheet and lenticular lens sheet so as to allow relative sliding movement between the two in a direction substantially perpendicular to the longitudinal axes of lenses on the lens sheet. The housing includes means for retaining the lenticular image sheet in a fixed position relative to the housing, and means for actuating the lenticular lens sheet in said direction of movement.

19 Claims, 20 Drawing Sheets

LENTICULAR IMAGE DISPLAY APPARATUS

FIELD OF THE INVENTION

The present invention relates to a lenticular image display apparatus.

BACKGROUND TO THE INVENTION

A lenticular image is a device which allows a viewer to view two or more different images depending on the angle at which the viewer observes the device. A lenticular image typically comprises a plurality of parallely disposed elongate lenses placed over interleaved slices of the images to be viewed. The device can be used to show entirely different images or can be used to generate an impression of motion.

The quality of the viewed images depends on the alignment and contact between the image slices and the lenses. To ensure good alignment and good contact, a sheet carrying the interleaved image slices is usually permanently fixed to the flat reverse face of a sheet carrying the lenses. As a result, the viewer is typically required to travel past the lenticular image in order to view the different images available.

Such lenticular images suffer from a number of disadvantages, including: the lenses are costly; the interleaved images are costly; correctly fixing the image sheet to the lens sheet is difficult; the lenses are not reusable; the images are not reusable; and the images are not clearly viewed from a head-on perspective.

Display apparatus are known in which the image sheet and the lens sheet are separate and in which the image sheet is actuated with respect to the lens sheet so that a static viewer may view each of the available images. However, such apparatus tend to be relatively complex, and therefore costly, and tend to suffer from poor alignment and poor contact between the lens sheet and the image sheet.

In view of these problems, various lenticular image apparatus normally have a limited appeal to businesses such as advertisers.

It would be desirable, therefore, to provide a lenticular image display apparatus which mitigates at least some of the problems associated with the prior art.

SUMMARY OF THE INVENTION

A first aspect of the invention provides, an apparatus for displaying a lenticular image comprising a lenticular image sheet and a lenticular lens sheet, the apparatus comprising a housing adapted to receive the lenticular image sheet and lenticular lens sheet so as to allow relative sliding movement between the two in a direction substantially perpendicular to the longitudinal axes of lenses on the lens sheet, wherein the housing includes means for actuating one of said lenticular image sheet and said lenticular lens sheet in said direction of movement.

In preferred embodiments, the lens sheet is actuatable by said actuating means and, at least during use, the image sheet is fixed with respect to the housing.

In some embodiments, the actuating means comprises a rotary cam in operative association with at least one cam follower such that rotation of the cam causes reciprocating movement of the at least one cam follower, the at least one cam follower being coupled to the lens sheet to impart reciprocating movement thereto.

In some embodiments, said actuating means comprises a rotatable member coupled to at least one lever, said at least one lever being coupled to the lens sheet to effect reciprocating movement of the lens sheet upon rotation of the rotatable member.

Preferred features are recited in the dependent claims.

A second aspect of the invention provides a lenticular image display apparatus comprising the apparatus of the first aspect of the invention and an assembly comprising an image sheet and a lens sheet.

Further advantageous aspects of the invention will become apparent to those ordinarily skilled in the art upon review of the following description of a specific embodiment of the invention and with reference to the accompanying drawings.

The preferred features as described hereinafter in various embodiments of the invention or as described by the dependent claims filed herewith may be combined as appropriate, and may be combined with any of the aspects of the invention as described herein, from any embodiment, or by the independent claims filed herewith, as would be apparent to those skilled in the art.

BRIEF DESCRIPTION OF THE DRAWINGS

Embodiments of the invention are now described by way of example and with reference to the accompanying drawings in which like numerals are used to indicate like parts and in which.

DETAILED DESCRIPTION OF THE DRAWINGS

Figure 1:
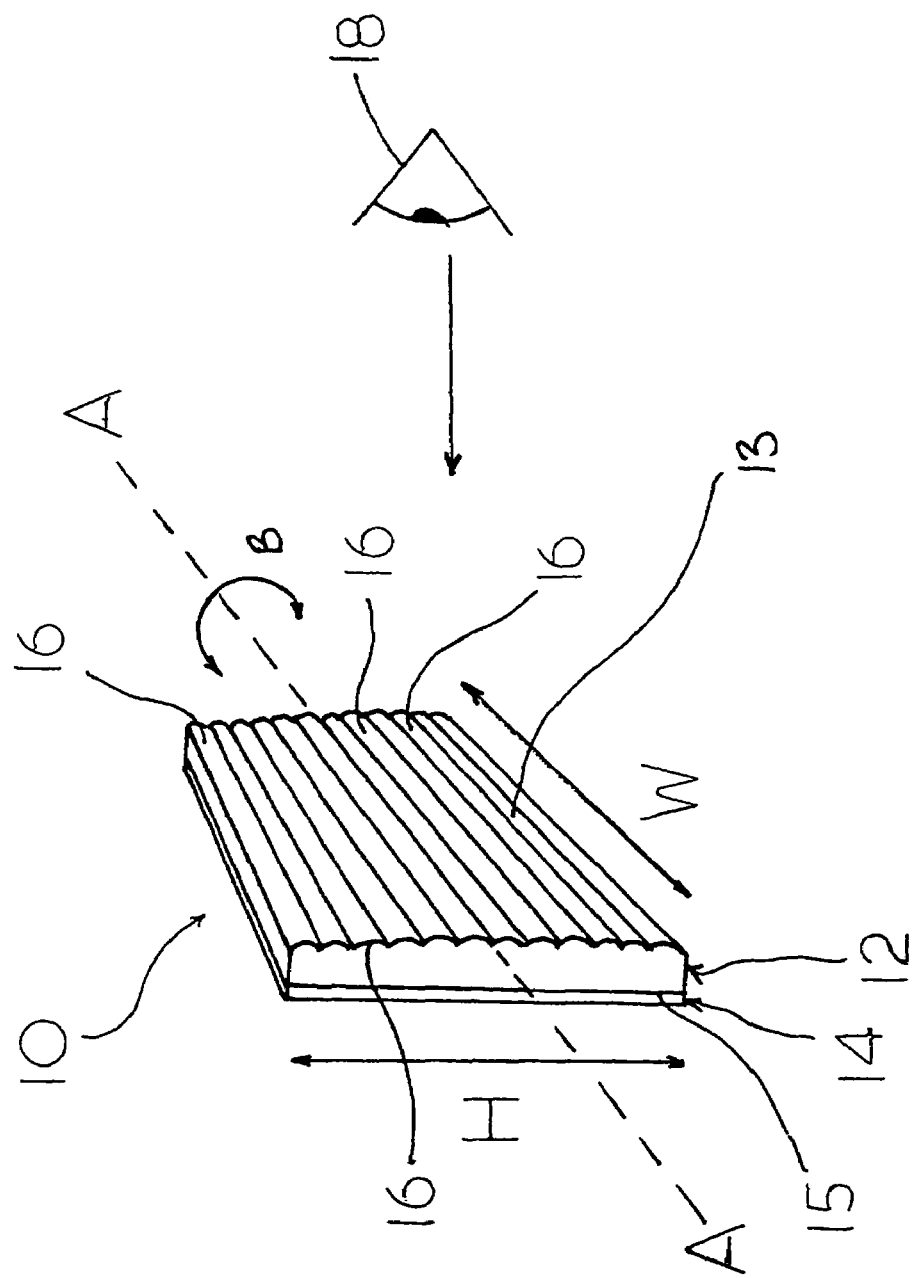
FIG. 1 is a schematic view of a lenticular image.

Referring now to FIG. 1 of the drawings, there is shown a lenticular image, generally indicated at 10. The lenticular image 10 comprises a sheet 12 of lenticular material and an image sheet or substrate 14. The lenticular sheet 12 comprises a plurality of parallely disposed elongate lenses 16, or lenticules, each having their respective axis of curvature parallel with their longitudinal axis. Hence, the obverse face 13 of the lenticular, or lens, sheet 12 is ribbed or grooved, while the reverse face 15 is substantially flat.

The image substrate 14, which may for example comprise paper, carries interleaved image slices or portions (not shown) which are substantially parallely disposed with respect to the longitudinal axes of the lenses 16. Each image slice comprises a portion of a whole image and the image slices of one whole image are interleaved with the image slices of another whole image on the substrate 14. The image slices are aligned with the lenses 16 so that a viewer (indicated schematically at 18) sees a particular set of image slices (and therefore a particular whole image) depending on the angle at which he views the lenticular image 10.

Typically, the image sheet 14 is fixed, e.g. glued, to the reverse face 15 of the lens sheet 12. In so doing, it is important not only that the image slices are correctly aligned with the lenses 16, but also that they are in close or intimate contact with the lenses 16. The image slices may equally be printed directly on the reverse face (not visible) of the sheet 12 in conventional manner.

The whole images carried on the substrate 14 can be viewed sequentially upon relative pivotable or rotational movement between the viewer 18 and the lenticular image 10. The images viewed may be entirely different or may be incremental versions of the same image to give an impression of motion. Typically, the image substrate 14 carries two inter-leaved images but may equally carry more than two. The curvature of the lenses 16, which is typically semi-cylindrical, is determined in conventional manner to suit the number and nature of the images to be displayed.

In FIG. 1, the viewer 18 can, for example, view the different images upon rotation or pivoting of the lenticular image 10 about an axis A-A as indicated by the arrow B, where the axis A-A runs substantially parallel with the longitudinal axis of the lenses 16. Similarly, lenticular images can be arranged so that the different images can be viewed by a viewer moving past the lenticular image.

Figure 2:
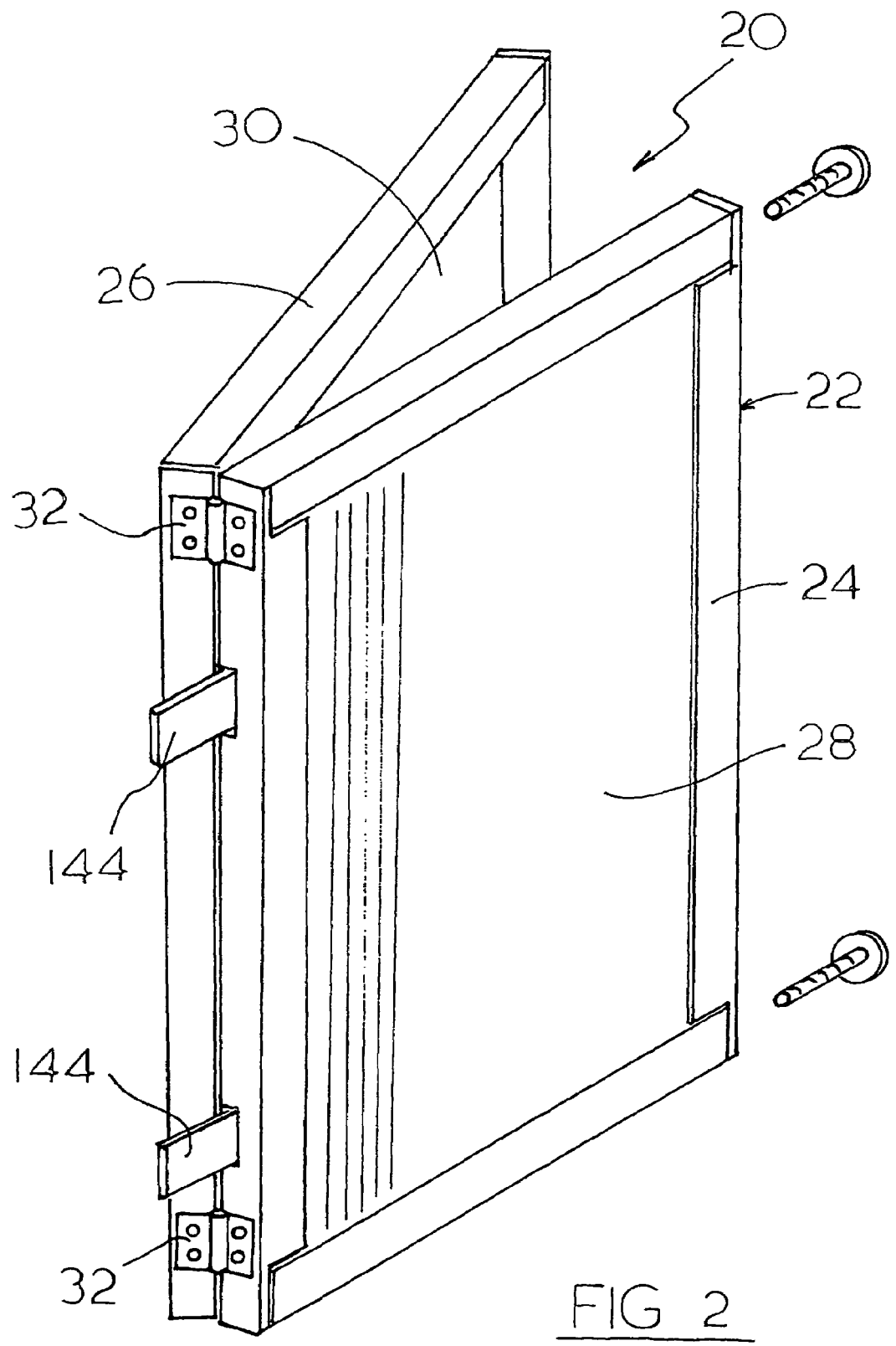
FIG. 2 is a perspective view of a lenticular image display apparatus embodying the invention.

Referring now to FIG. 2, there is shown, generally indicated as 20, a display apparatus for lenticular images. The display apparatus 20 comprises a housing 22 which, in the preferred embodiment, comprises first and second frames 24, 26 each defining a respective display window 28, 30. Preferably, a respective sheet of transparent material, e.g. plastics or glass, is provided in each display window 28, 30. The frames 24, 26 are operable between a closed state (shown in FIG. 4) and an open state (shown in FIG. 2). To this end, the frames 24, 26 are conveniently hinged to one another (see hinges 32) but may alternatively be interconnectable by other conventional means. Locking means (not shown) are preferably provided to maintain the housing 22 in the closed state. The frames 24, 26 may take any suitable shape but, most conveniently, are generally rectangular. The frames 24, 26 are preferably formed from a rigid material, e.g. aluminium or plastics. It will be understood that both frames 24, 26, need not necessarily define a display window—only the frame which, in use, exposes the lenticular image need define a display window.

Figure 3:
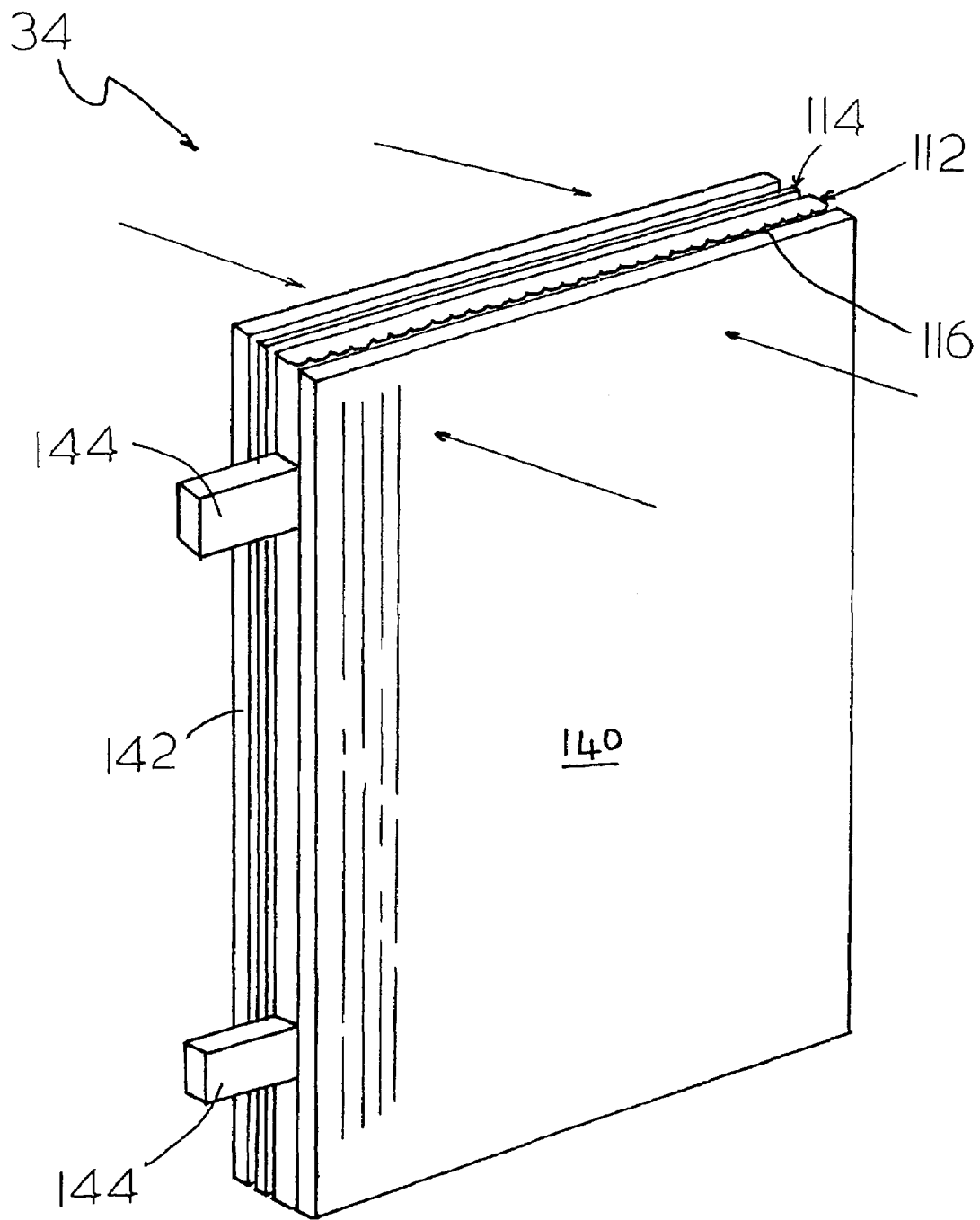
FIG. 3 is a perspective view of a lenticular image display assembly for housing within the apparatus of FIG. 2.

The housing 22 is arranged to house a lenticular image assembly as illustrated in FIG. 3. FIG. 3 shows a preferred lenticular image assembly 34 comprising a lenticular, or lens, sheet 112, and an image sheet 114 sandwiched between first and second plates 140, 142. The lens sheet 112 comprises a plurality of lenses 116 and is generally similar to the lens sheet 12. The lens sheet 112 may be formed from any suitable transparent rigid or semi-rigid material, for example plastics. The image sheet 114 is generally similar to image sheet 14. However, the image sheet 14 and the lens sheet 112 are not fixed to one another and are therefore capable of relative sliding movement with respect to one another. In FIG. 3, the lens sheet 112 and image sheet 114 adopt a close or intimate facing relationship with one another. The lens sheet 112 and image sheet 114 may be in direct contact with one another, i.e. direct facing engagement, or they may be separated by an intermediate transparent sheet (not shown) to facilitate relative sliding movement between the two. Any such intermediate sheet must be sufficiently thin so as not to be significantly detrimental to image quality. Alternatively, other lubricating means may be provided between the image sheet 114 and the lens sheet 112. The image sheet 112 may be laminated between transparent plastics layers (not illustrated).

The plates 140, 142 are formed from rigid or semi-rigid material such as glass or plastics. The first plate 140 which, during use, is located against the ribbed face of the lens sheet 112 (i.e. the face that is viewed by a viewer) is formed from transparent material. In cases where the lenticular image 112, 114 is to be backlit, the second plate 142 is also formed from transparent material. Material marketed under the name Perspex (a transparent thermoplastic acrylic resin) or Lexan (a polycarbonate material) are suitable, as is glass. In cases where no backlighting is required, the second plate 142 may be formed from opaque material or may be omitted Lo reduce cost in which case the image sheet 114 comprises rigid or semi-rigid material, e.g. card.

The lens sheet 112 comprises one or more lugs 144. In the illustrated embodiment, the lens sheet 112 comprises two spaced apart lugs 144 projecting from one side of the lens sheet 112 such that the lugs 144 are substantially coplanar with the lens sheet 112.

The lens sheet 112, image sheet 114 and plates 140, 142 are each substantially rectangular in shape and are of similar size. Hence, the overall lenticular image assembly 34 is substantially rectangular in both transverse and longitudinal cross-section. The shape and size of the assembly 34 is such that it may be housed with the housing 22.

Figure 4:
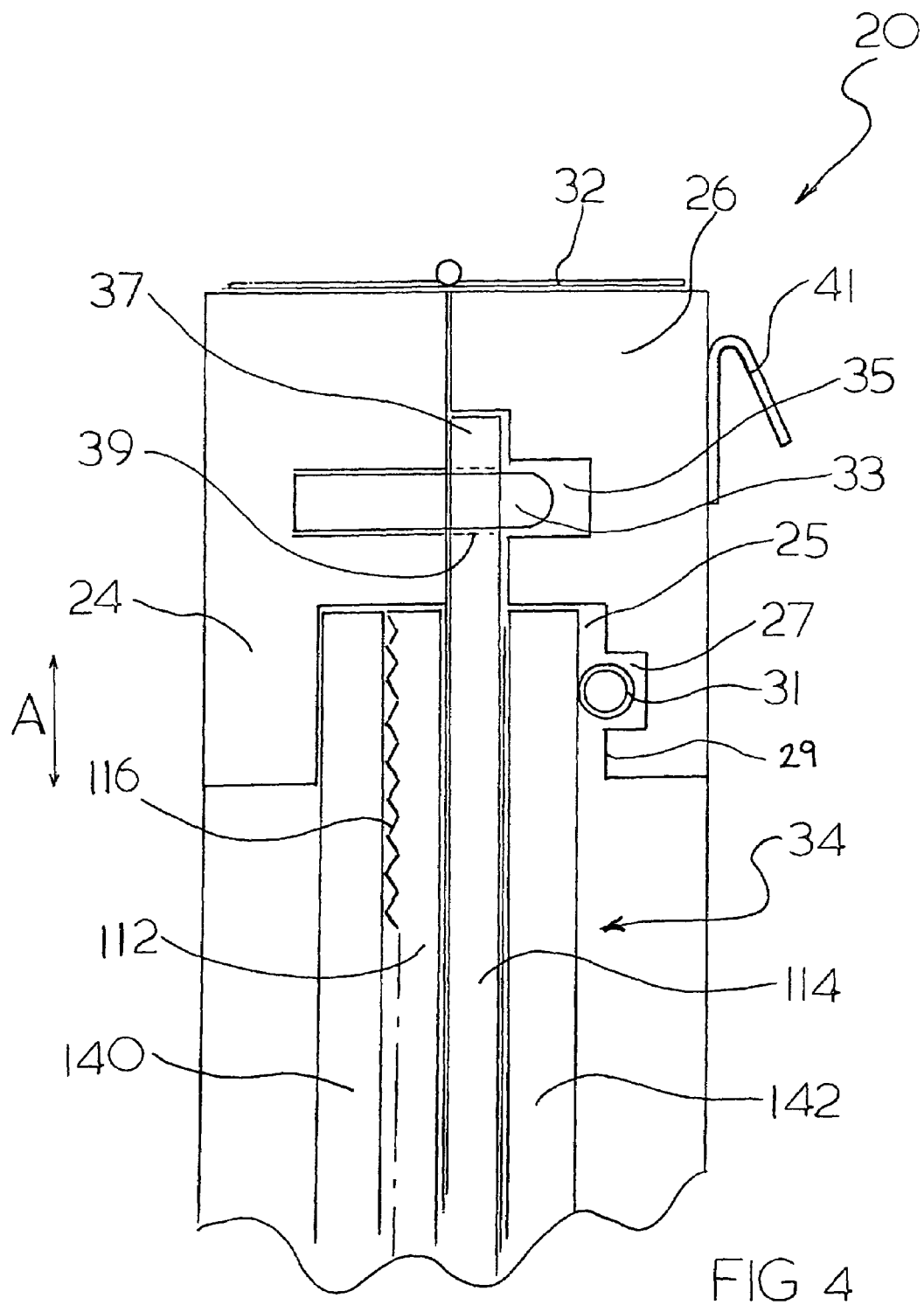
FIG. 4 is a side section view of part of the apparatus of FIG. 1 housing the assembly of FIG. 2.

Referring now to FIG. 4, the assembly 34 is shown housed within the housing 22, the housing 22 adopting the closed state. It will be seen that the housing 22 is arranged to grip the assembly 34 and so to apply pressure squeezing the assembly 34 together. To this end, the frames 24, 26 are shaped to define, together, a recess 25, when in the closed state, the recess 25 running around the periphery of the windows 28, 30.

The recess 25 is shaped and dimensioned to receive the periphery of the lenticular image assembly 34. In order to ensure that the recess 25 applies a squeezing force, i.e. grips, the assembly 34, it is preferred that a flexible padding, e.g. of rubber, is provided around at least one side of the recess 25. In the illustrated embodiment, a second recess 27 is formed in one of the frames 26 such that the second recess 27 runs around the side wall 29 of the first recess 25. A flexible, resilient padding component 31 is located in the second recess 27. The padding component 31 may for example take the form of a rubber ring. The arrangement is such that, when the assembly 34 is closed within the housing 22, the padding component 31 is compressed between the frame 26 and the assembly 34. This ensures that the assembly 34 is held within the housing 22 under pressure. The pressure is sufficient to maintain a close or intimate contact between the image sheet 114 and the reverse face of the lens sheet 112.

The housing 22 may also include locating means for interaction with the image sheet 114 to maintain the image sheet 114 in a fixed position within the housing 22. In the preferred embodiment, one frame 24 carries a locating pin 33 and the other frame 26 defines a corresponding pin-receiving recess 35 which receives a protruding portion of the pin 33 when the housing is closed. The image sheet 114 includes a corresponding pin-receiving aperture 39 formed adjacent one end 37 of the sheet 114. Conveniently, the recess 35 is shaped to accommodate the end 37 of the sheet 114. When the assembly 34 is properly located with the closed housing 22, the pin 33 passes through the aperture 39 thereby fixing the position of the image sheet 114 with respect to the housing 22.

Hence, with the housing 22 in the closed state as shown in FIG. 4, the image sheet 114 adopts a fixed position. The plates 140, 142 (when present) are also preferably fixed with respect to the housing 22. Conveniently, this is achieved by dimensioning the plates 140, 142 so that they substantially fill the recess 25. However, the lens sheet 112 is capable of sliding movement within the housing 22. In FIG. 4, the direction of movement of the lens plate 112 is indicated by arrow A and is substantially perpendicular to the longitudinal axes of the lenses 116 on the lens sheet 112. Hence, the lens sheet 112 is smaller than the recess 25 at least in the direction of movement.

Figure 6:
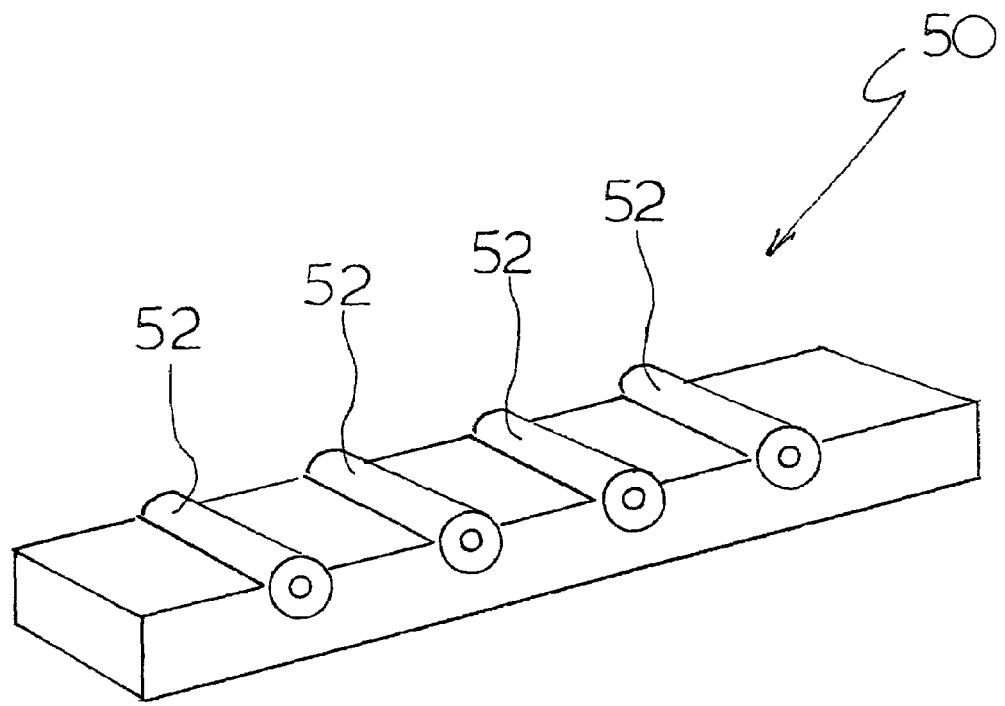
FIG. 6 is a perspective view of a slipper bearing.

In a preferred embodiment, a slipper bearing (e.g. comprising a strip of plastics), roller(s), ball bearings, or similar bearing device, is provided between the lens sheet 112 and the, in use, lower side of the frame 24 in order to reduce wear on the lens sheet 112 and/or frame 24 that would otherwise be caused by sliding engagement between the two. By way of example, FIG. 6 shows a slipper bearing 50 incorporating plurality of rollers 52.

Figure 7:
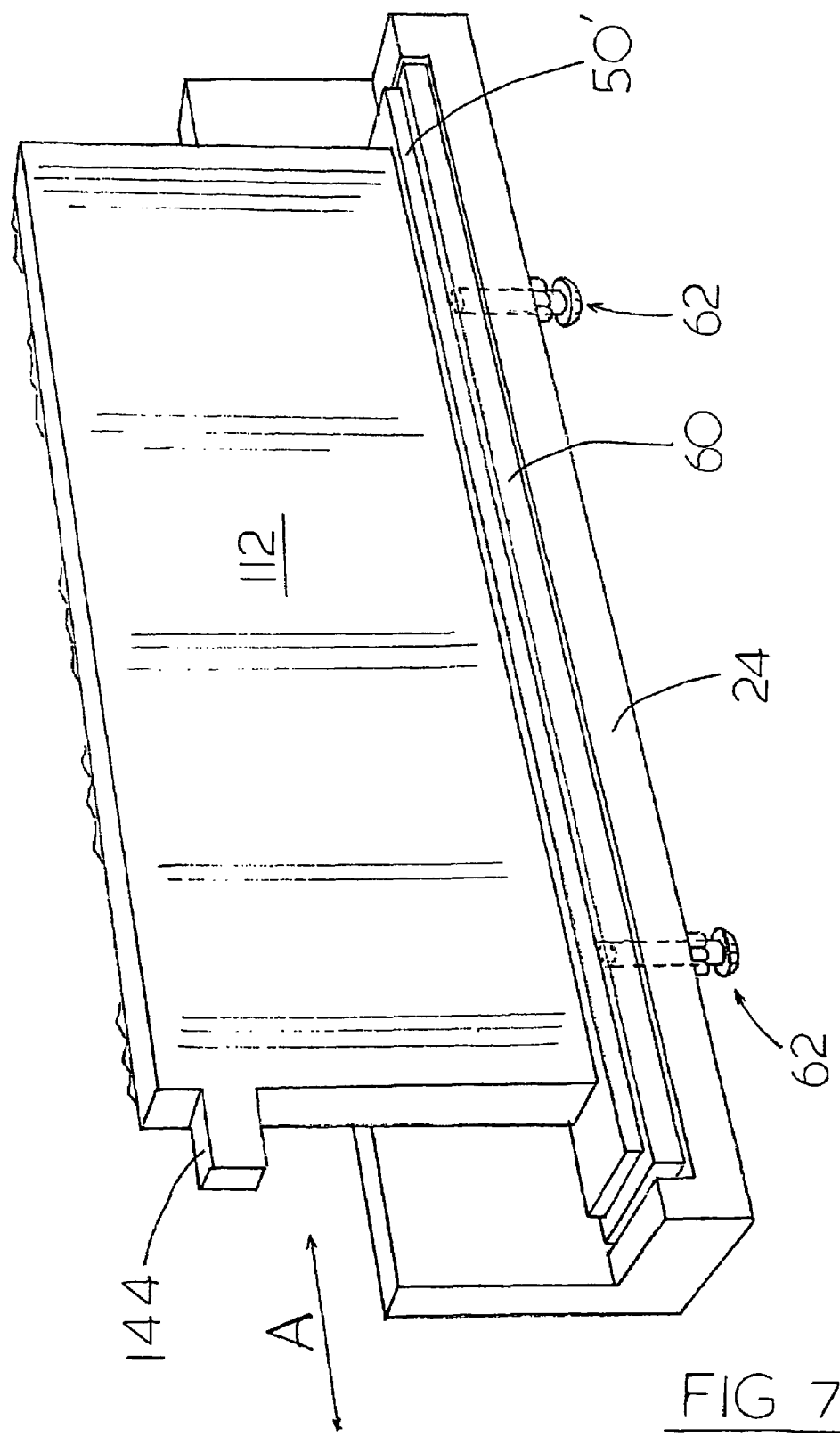
FIG. 7 is a perspective view of part of the apparatus of FIG. 2 including a tilt adjustment mechanism.

By way of further example, FIG. 7 shows the, in use, lower part of the frame 24 and lower part of the lens sheet 112 with a slipper bearing 50' inserted therebetween. The slipper bearing 50' comprises a strip of relatively hard wearing, low friction material, e.g. nylon. Also shown in FIG. 7 is a tilt adjustment bar or plate 60 located between the lens sheet 112 and the lower side of the frame 24. A pair of adjustment screws 62 are threaded into the adjustment plate 60. The screws 62 pass through the lower side of the frame 24 and are fixed relative to frame 24 such that they may rotate about their respective longitudinal axis but are substantially unable to move in the direction of their longitudinal axis. Hence, upon rotation of one or both of the screws, the lens sheet 112 may be tilted under the action of the tilt plate 60 about an axis substantially perpendicular to the plane in which the lens sheet 112 lies. Tilt adjustment may be used, if necessary, in aligning the lens sheet 112 and image sheet 114.

Also shown in FIG. 4 is a hook 41 which may be used to hang the housing 22 on a wall during use, or to locate the housing 22 within a conventional advertising display apparatus such as a light box (not shown).

Figure 5:
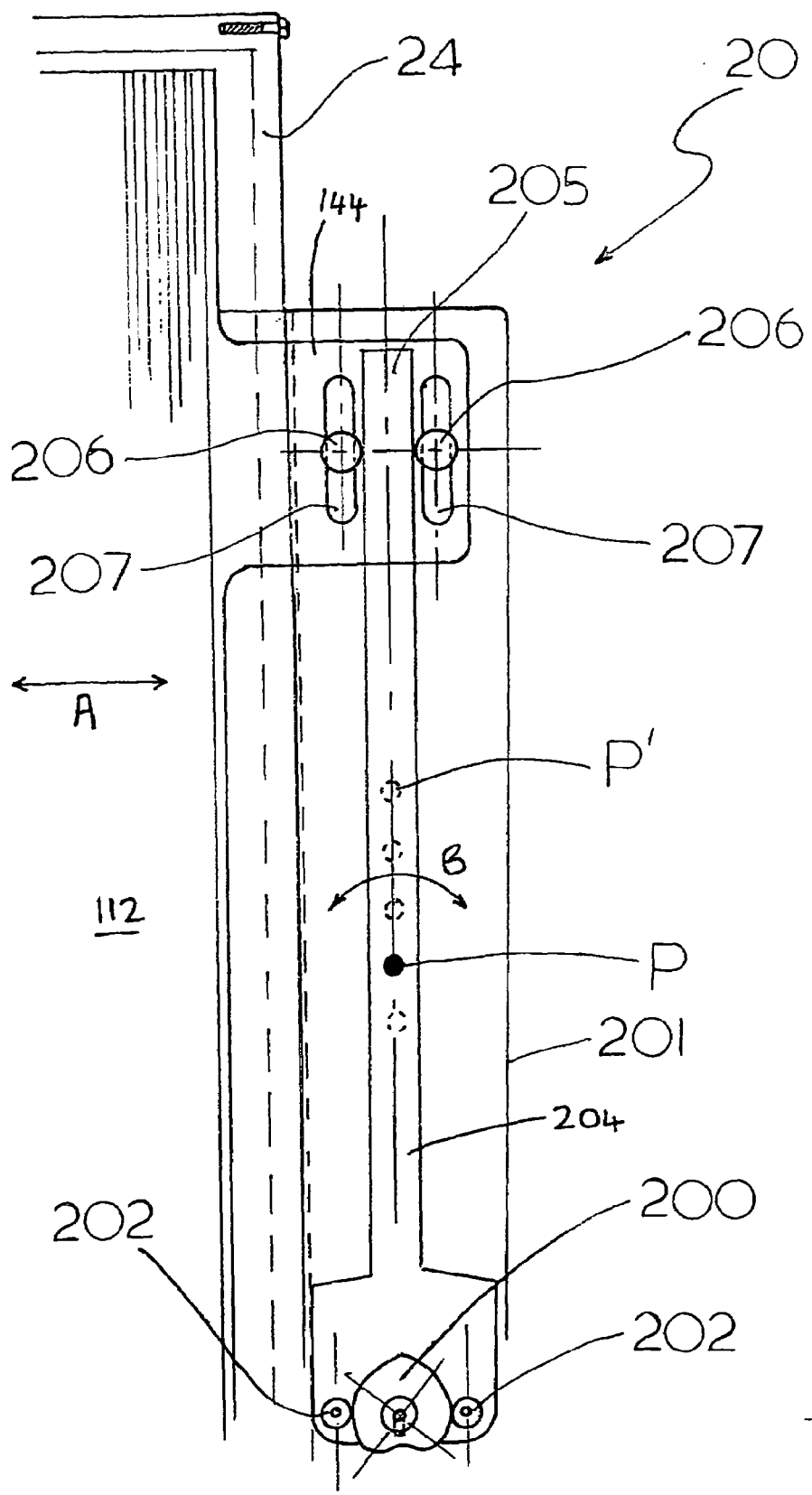
FIG. 5 illustrates a drive mechanism suitable for use with the apparatus of FIG. 2.

As may be seen from FIG. 2, the housing 22 defines a respective aperture to allow each lug 144 of the lens sheet 112 to protrude from the housing 22. The protruding lugs 144 may be used to actuate the lens sheet 112 with respect to the housing 22. FIG. 5 shows an example of a suitable mechanism for driving or actuating the lens sheet 112. The actuating mechanism comprises a cam 200 and preferably two cam followers 202. The cam followers 202 are each coupled to at least one, and preferably a respective, lever 204 (only one shown, but a respective lever 204 may be provided for each lug 144, wherein each lever may be operated by the same cam/cam follower assembly), the or each lever 204 being capable of pivoting oscillatory movement (as indicated by arrow B) about a respective pivot point P. The following description describes only the single illustrated lever 204 although it will be apparent that a corresponding description applies to the other lever, when present. In the preferred embodiment, the location of pivot point P with respect to the lever 204 is adjustable. In FIG. 5, a plurality of alternative pivot points P' are shown in broken outline. The pivot points P, P, may be provided in any convenient manner. For example, respective apertures may be formed in the lever 204 and in the housing 201 of the actuating mechanism such that a pivot pin (not shown) may be inserted through a selected aperture in the lever 204 and a corresponding aperture in the housing 201.

In use, any one of the pivot points P, P' may be selected as the actual pivot point P of the lever 204. The closer the selected pivot point P is to the end 205 of the lever 204, the greater the leverage that may be exerted on the lens sheet 112 but the smaller the extent of the reciprocating movement imparted to the lens sheet 112 by the lever 204. Preferably, the spacing between selectable pivot points P, P' corresponds with the width of the lens 116 on the lens sheet 112 (or a multiple thereof) such that the amount by which the lens sheet 112 moves in any one direction is substantially equal to one lens width or a (whole) multiple of one lens width, depending on which pivot point P, P' is chosen. This ensures that the lens sheet 112 and image sheet 114 are kept substantially in register with one another irrespective of which pivot point is chosen. Hence, by selecting a suitable pivot point P, P', the user is able to select how far he wishes the lens sheet 112 to travel with respect to the image sheet 114.

Each lug 144 carries one or more locating members, for example two pins 206, between which the end 205 of the respective lever 204 is located. An electric motor (not shown) is provided for driving the cam 200. The cam 200 may be eccentrically coupled to the drive shaft of the motor. The actuating mechanism, including cam 200, followers 202 and levers 204, and the lugs 144 may be housed in housing 201 which may take the form of a bracket or casing located adjacent the frames 24, 26 and which may be detachably fixed thereto.

As the cam 200 rotates, the cam followers 202 impart oscillatory pivoting movement to the or each lever 204. The or each lever 204 imparts reciprocating movement to the lens sheet 112 (as indicated by arrow A) via the locating pins 206 on the lugs 144. Reciprocating movement of the lens sheet 112 causes each image of the lenticular image to be displayed in turn.

The position of locating pins 206 on the lug 144 are preferably adjustable in a direction substantially perpendicular with the direction of movement of the lens sheet 112. To this end, in the embodiment of FIG. 5, each pin 206 is slidable within a respective slot 207 (formed in the lug 144) and may be fixed at any position within the slot. By adjusting the position of the pins 206, the reciprocating movement of the lens plate 112 can be adjusted. More specifically, this allows relatively fine adjustment of the relative position of the image sheet 112 with respect to the image sheet 114 and may be used to ensure that the lens sheet 112 and the image sheet 114 are correctly aligned with one another.

Preferably, the cam 200 is a constant rate rise and fall cam, i.e. the profile, or cam surface. of the cam 200 is arranged so that the resultant reciprocating movement of the lens sheet 112 has a constant rate in both directions. For example, the cam 200 may have a generally heart-shaped cam surface.

In the preferred embodiment, the image strips are carried on a transparent film made of a transparent material such as Perspex (Trade Mark) or Duratrans (Trade Mark). The typical thickness of the film may be between 0.007 thousandths of an inch up to 3 mm. In cases where the image sheet 114 comprises card, the card may typically be in the region of 1 mm thick. It will be appreciated that different thicknesses may alternatively be used although it is preferable to have the image sheet 114 relatively thin in order to reduce the costs of producing the image sheet 114.

By way of a typical example, for a housing 22 arranged to display lenticular images of approximately A1 paper size, the plates 140, 142 may be approximately 2 mm in thickness while, for images of "six sheet" size(1200 mm wide×1800 mm high), the thickness of the plates 140, 142 may be approximately 4 mm.

The cam 200 and lever 204 assembly may for example be arranged to provide a 5 to 1 ratio of leverage. The adjustable pins 206 may, for example, allow this ratio to be adjusted between, for example, 5.2 and 0.8.

The constant rate rise and fall of the cam 200 may be arranged to provide a lift of the lens sheet 112 within the range 7 mm to 23 mm (typically for A1 or six sheets display).

Varying speeds of reciprocation of the lens sheet 112 can be achieved by changing the cam lift so that the lenses 116 undergo smaller or larger movements with respect to the image sheet per revolution of the cam 200.

The apparatus 20 may be used with image sheets 114 carrying either a plurality of interleaved static images or a plurality of interleaved images which, when viewed in sequence, give the impression of animated movement. The actuating mechanism, and in particular the speed rotation of the cam 200 and the location of the selected pivot point P, may be readily adjusted to suit the intended use. It is preferred to use image sheets which give the impression of animated movement since the animated sequence may be viewed "head on", i.e. from a line of sight perpendicular to the plane of the lens sheet/image sheet, as well as from lines of sight that are oblique with respect to the plane of the lens sheet/image sheet.

It will be appreciated from the foregoing that the apparatus of the invention provides a relatively simple device for displaying lenticular images and may be particularly attractive to advertisers who use existing advertising light boxes since the apparatus of the invention may readily be incorporated into existing light boxes.

Moreover, because the lens sheet is not permanently fixed to the image sheet, the lens sheet 112 is effectively reusable—only the image sheet 114 needs to be discarded when the image becomes redundant. Further, because the image sheet 114 remains static within the housing 22, it does not need to be formed from a rigid or heavy-duty material. Rather, it may be formed from a thin film of plastics or paper. Hence, the disposable part of the apparatus, i.e. the image sheet, is relatively inexpensive.

Figure 8:
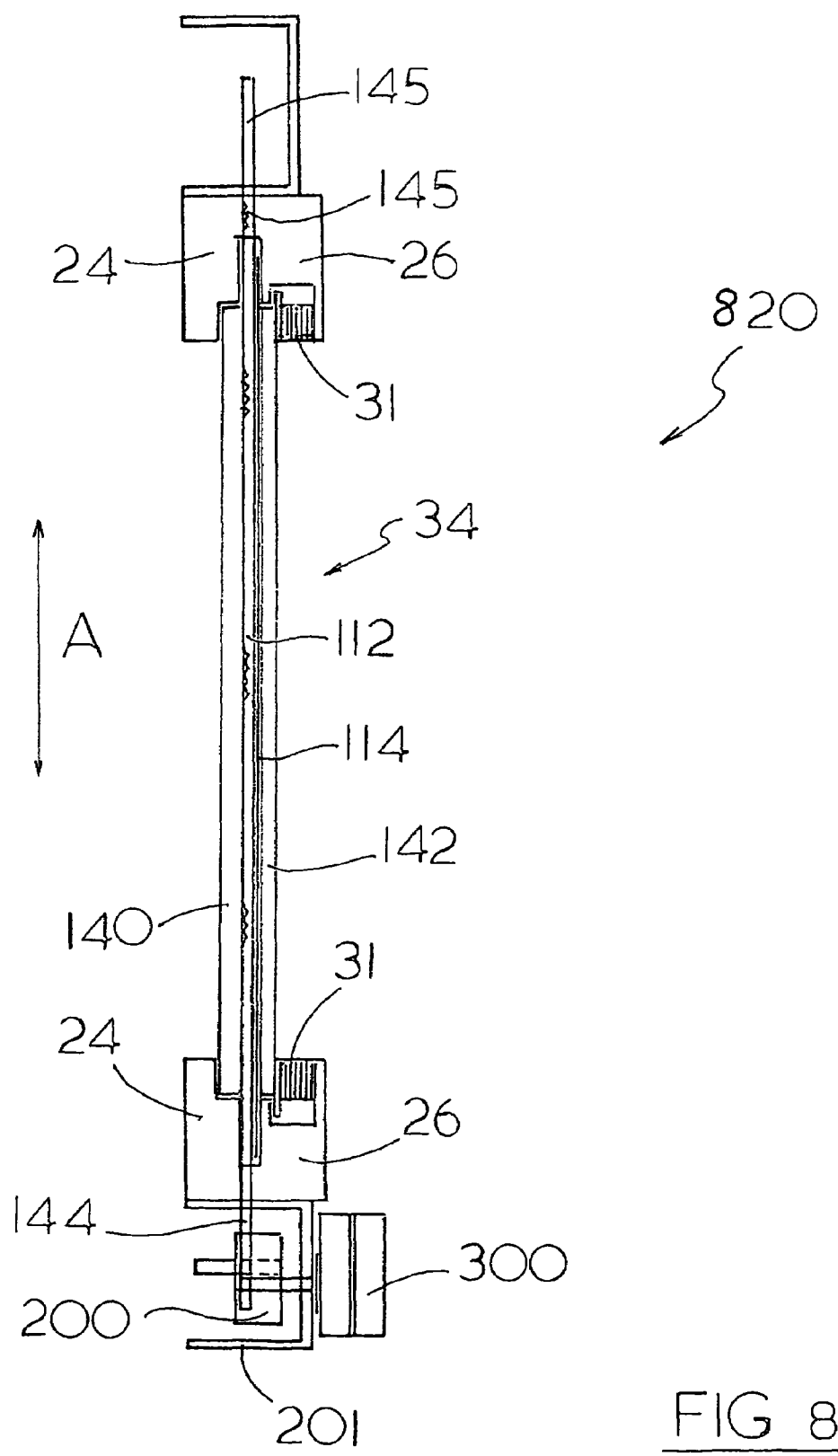
FIGS. 8 to 11 each illustrate a respective alternative embodiment of a display apparatus according to the invention.

By way of further illustration, FIG. 8 shows a side section view of an apparatus 820 embodying the invention which is generally similar to the apparatus illustrated and described in FIGS. 2 to 7 and on which corresponding reference numerals are used. FIG. 8 shows the cam 200 and a motor 300 arranged to actuate a cam 200 in order to impart a reciprocating motion to the lens sheet 112 in the general direction indicated by arrow A.

The apparatus 820 shown in FIG. 8 shows that the lens sheet 112 includes one or more second lugs 145 generally oppositely disposed on the lens sheet 112 to lugs 144. The frames 24, 26 are shaped to define a respective aperture or passage to accommodate the lugs 145 when closed together. The second lugs 145, in conjunction with the passage or aperture formed between (and preferably through) the frames 24, 26 to receive the lugs 145, serves to guide the lens sheet 112 as it moves back and forth during use.

It will be noted from FIG. 8 that the motor 300 and actuating mechanism coupled thereto are located at or adjacent the lugs 144 at one side of the apparatus 820. Bearing in mind that, in some modes of use, the apparatus 820 is inserted into an existing light box (not shown), it is not always practical to have the motor 300 and associated actuating mechanism located at one side of the apparatus 820 as there may not be sufficient room in the light box.

Figure 9:
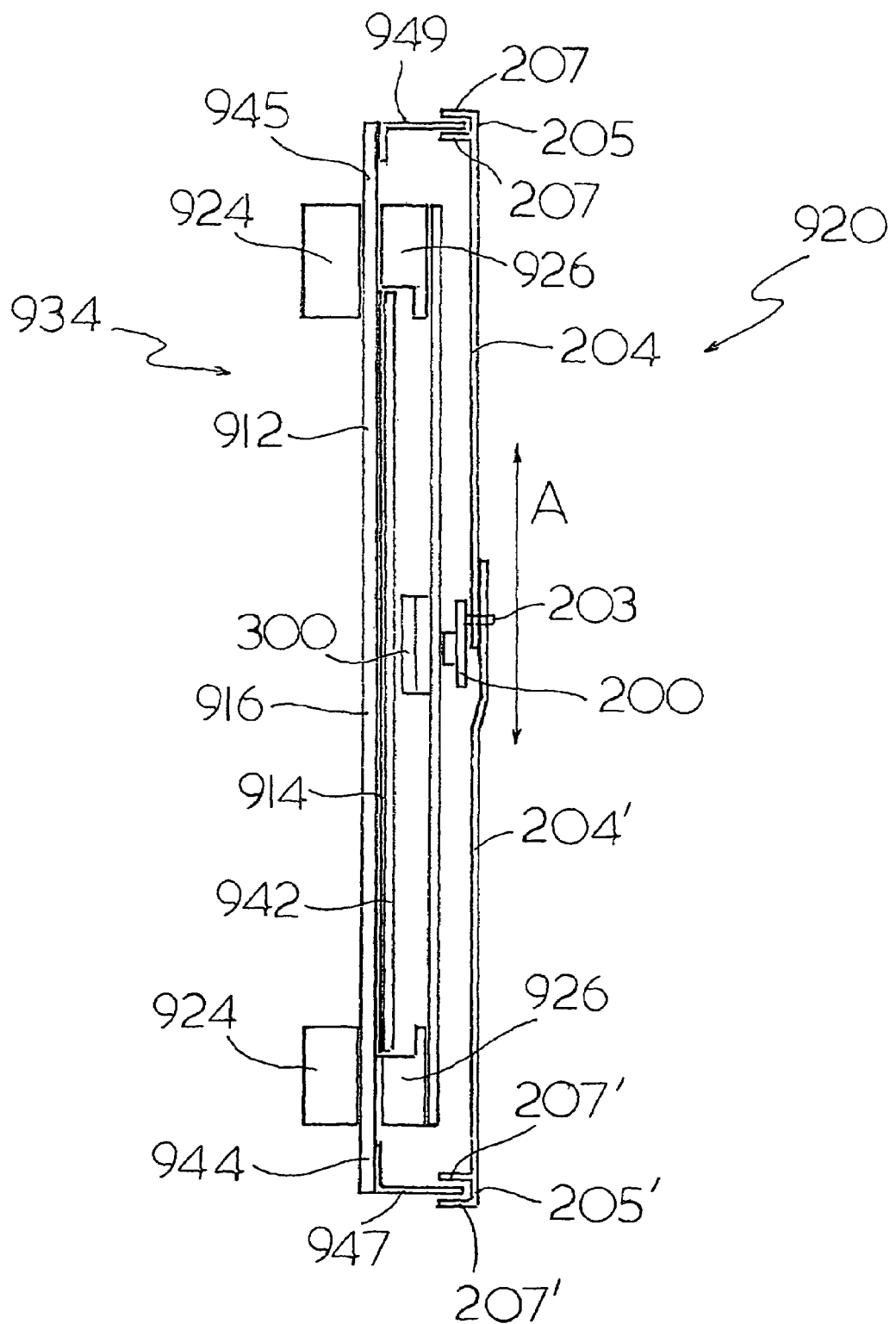

FIG. 9 shows an alternative embodiment of a display apparatus 920 in which the motor 300 and the actuating mechanism are located at the, in use, rear of the apparatus 920, i.e. behind the lenticular image assembly 934. In FIG. 9, the apparatus 920 is generally similar to the apparatus 20, 820 shown in FIGS. 1 to 8 and like numerals are used to indicate like parts. It will be noted however that the lenticular image assembly 934 does not, for the purposes of illustration only, include a first plate against the obverse face (i.e. the face that carries the lenses 916 of the lens sheet 912). In general, the first plate 140 is an optional component of the lenticular image assembly 34, 934.

In the embodiment of FIG. 9, at least one of the lugs 944, 945 carries a respective arm 947, 949 extending substantially perpendicularly from the lens sheet 912. The actuating mechanism includes a rotatable member or cam 200 coupled to the motor 300 for rotation, in use, in a plane substantially parallel with the plane in which the lens sheet 912 is disposed. The cam 200 carries a cam rod 203 which rotates with the cam 200. A respective linkage lever 204, 204' is coupled to the cam rod 203 and to a respective one of the arms 949, 947. The arrangement is such that, upon rotation of the cam 200, the levers 204, 204' impart reciprocating, or oscillatory movement to the lens sheet 912 via arms 949, 947. To this end, it is preferred that the respective ends 205, 205' of the levers 204, 204' carry a respective two, spaced apart locating members or pins 207, 207' arranged to receive the respective arm, 949, 947 therebetween. The locating pins 207, 207' preferably extend substantially perpendicularly from the levers 204, 204' and substantially parallel with the arms 949, 947. The non-fixed inter-engagement of the arms 949, 947 and respective pins 207, 207' provide a non-rigid coupling between the lens sheet 912 and the levers 204, 204'. In an alternative embodiment (not illustrated) a pair of cam followers are provided in operative association with the cam 200, a respective end of each lever 204, 204' being coupled to a respective cam follower (instead of to the pin 203). The arrangement is such that the cam followers impart reciprocating movement to the levers 204, 204' which in turn impart reciprocating movement to the lens sheet, as described above for FIG. 9.

Mounting the motor 300 and actuating mechanism 200, 203, 204, 204', 205, 205' at the rear of the apparatus 920 is particularly useful in situations where the apparatus 920 is to be inserted into a light box that does not offer sufficient room at its sides.

Figure 11:
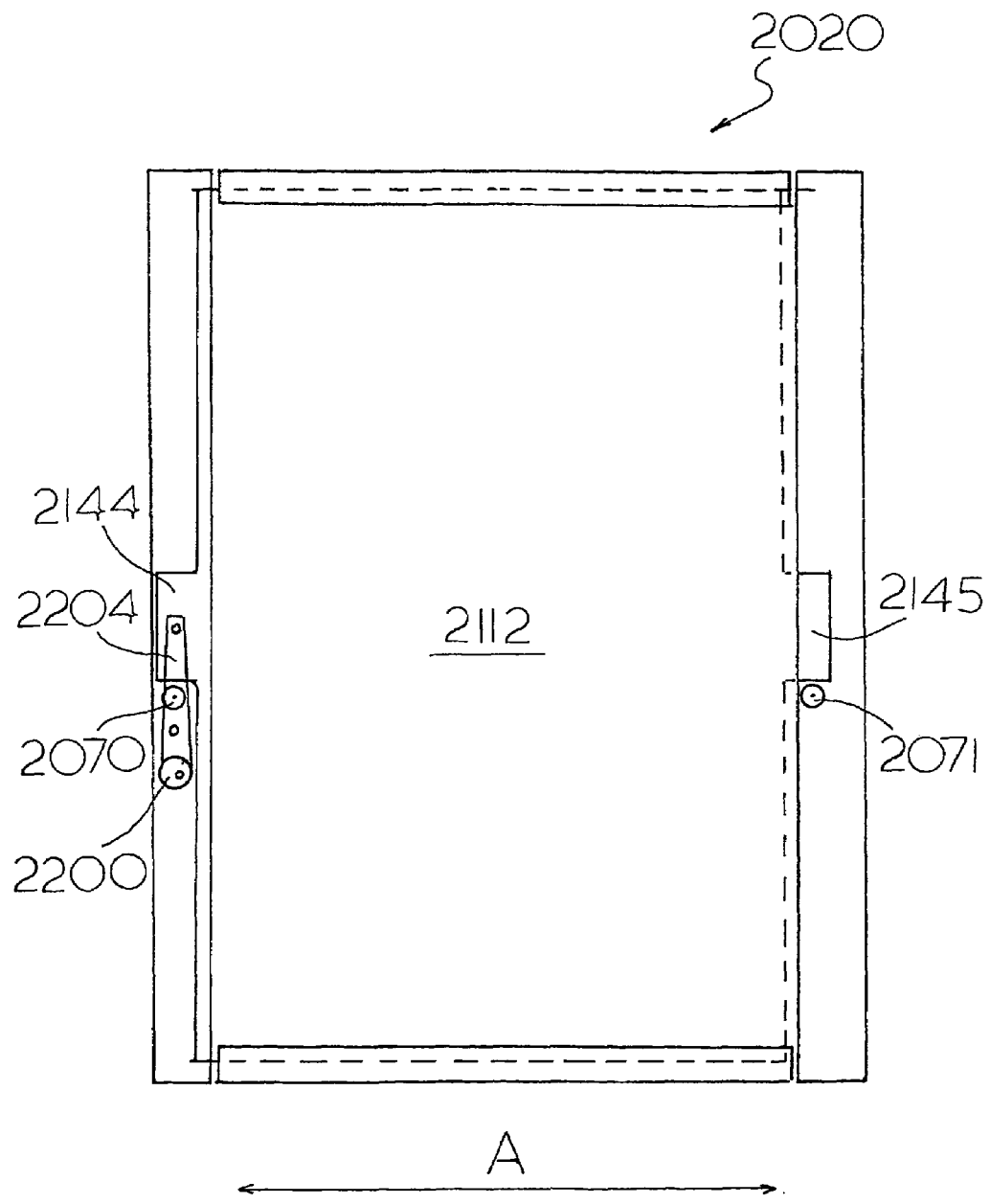

Preferably, the lens sheet 912 has a single lug 944, 945 on two opposing sides (see FIG. 11 in which the lugs are labelled 2144, 2145) which are preferably substantially centrally located on the respective sides as shown in FIG. 11. In such an embodiment, the motor 300 and cam 200 are conveniently substantially centrally located with respect to the lens sheet 912. In an alternative embodiment, the lugs 944, 945 need not be centrally located on their respective sides of the lens sheet 912. Moreover, the actuating mechanism may only comprise one lever 204 coupled to one side of the lens sheet 912 only.

Figure 10:
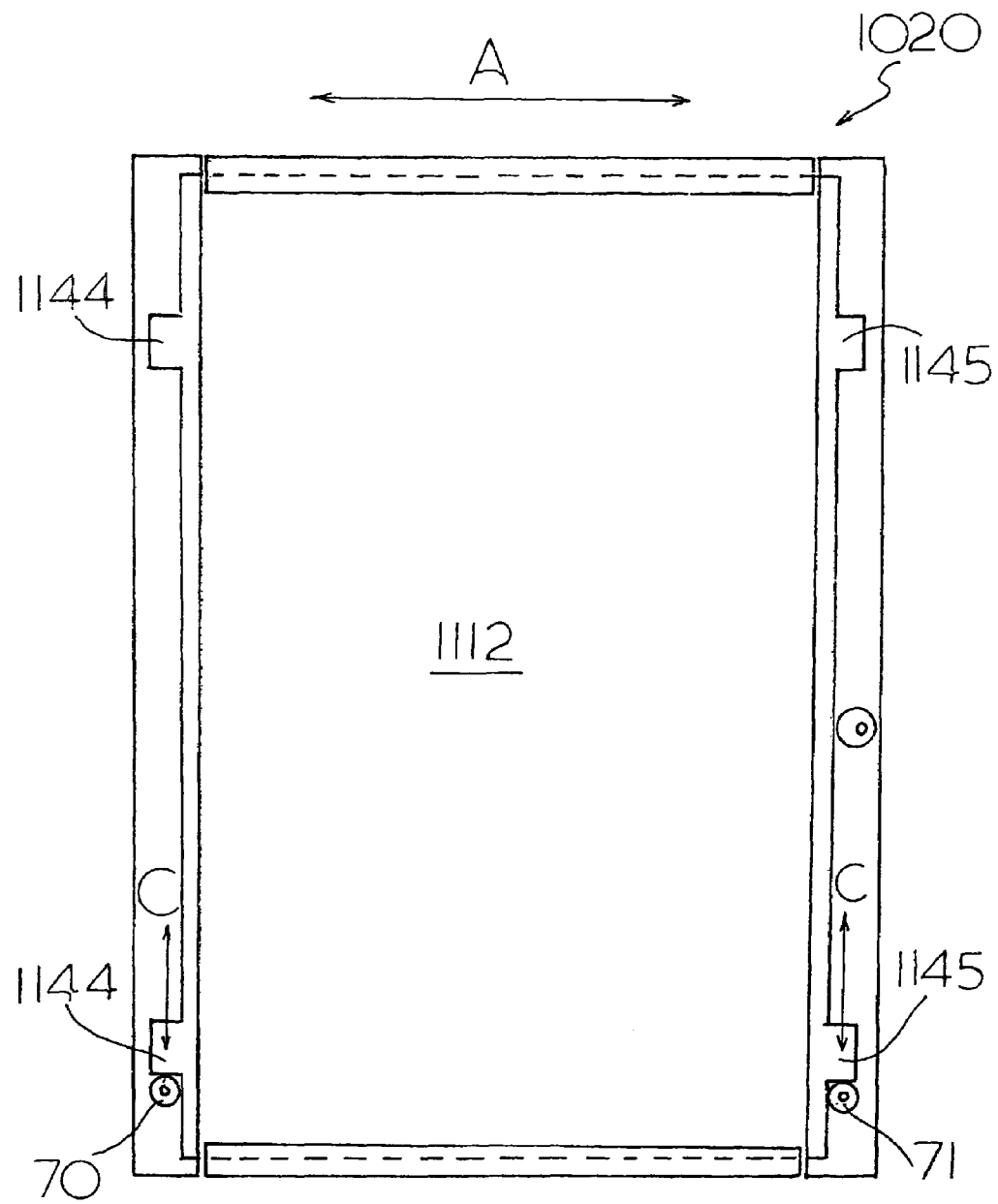

FIG. 10 illustrates a further embodiment of the invention in which the slipper bearing 50, 50' is replaced by one or more cams 70, 71 (two shown), each cam 70, 71 serving as, comprising or carrying, a bearing (e.g. a ball bearing). In FIG. 10, the apparatus 1020 is shown with a respective two lugs 1144, 1145 on two opposite sides of the lens sheet 1112. The cams, 70, 71 are associated with the respective lug 114, 115 on either side of the lens sheet 1112 and are eccentrically mounted on the apparatus 1020 for rotation with respect to lugs 1144, 1145. The arrangement is such that each cam 70, 71 (or the bearing associated therewith) engages with the respective lug 1144, 1145 so that, upon rotation of the cams 70, 71, the lugs 1144, 1145, and therefore the lens sheet 1112, are moved up or down in the direction indicated by arrows C, depending on the angular position of cams 70, 71. This may be achieved in any convenient manner, for example by eccentrically mounting the cams 70, 71 (which may have a generally circular cam surface) with respect to their axis of rotation, or by selecting an appropriately shaped cam surface.

FIG. 11 illustrates a further embodiment in which the lens sheet 2112 has a single lug 2144, 2145 on opposing sides, each lug 2144, 2145 preferably being centrally located on its respective side. Each lug 2144, 2145 is associated with a cam 2070, 2071 in a substantially similar manner to that described for the cams 70, 71 of FIG. 10. FIG. 7 also shows an actuating mechanism including a cam 2200 (or other rotatable member) and lever 2204 connected to the lug 2144 for imparting reciprocating movement to the lens sheet 2112 in the direction of the arrow A. The cam 2200 and lever 2204 may operate in a similar manner to the actuating mechanism of FIG. 5 (although cam followers are not shown in FIG. 11), or the lever may be actuated directly by the cam 2200, in which case the cam 2200 is rotated during use in a back-and-forth manner.

A still further embodiment of a display apparatus 3020 is presented in FIGS. 12 to 16. The display apparatus 3020 may be generally similar to the apparatus of previously described embodiments, except that the drive mechanism 3117 is located adjacent a side 3 123 of the lens sheet 3112 that is generally parallel with the direction of movement of the lens sheet 3112 (as indicated by arrow A). This is in contrast to the embodiment of FIGS. 1 to 7 in which the drive mechanism is located adjacent a side of the lens sheet 112 that is generally perpendicular to the direction of movement of the lens sheet 112. In use, this usually means that the drive mechanism 3117 is located at the upper side or lower side of the display apparatus 3020. The apparatus 3020 is particularly suitable for use with light boxes (not shown) or other display equipment in which there is limited space at the, in use, vertical sides of the equipment or in which there is restricted depth.

Figure 12:
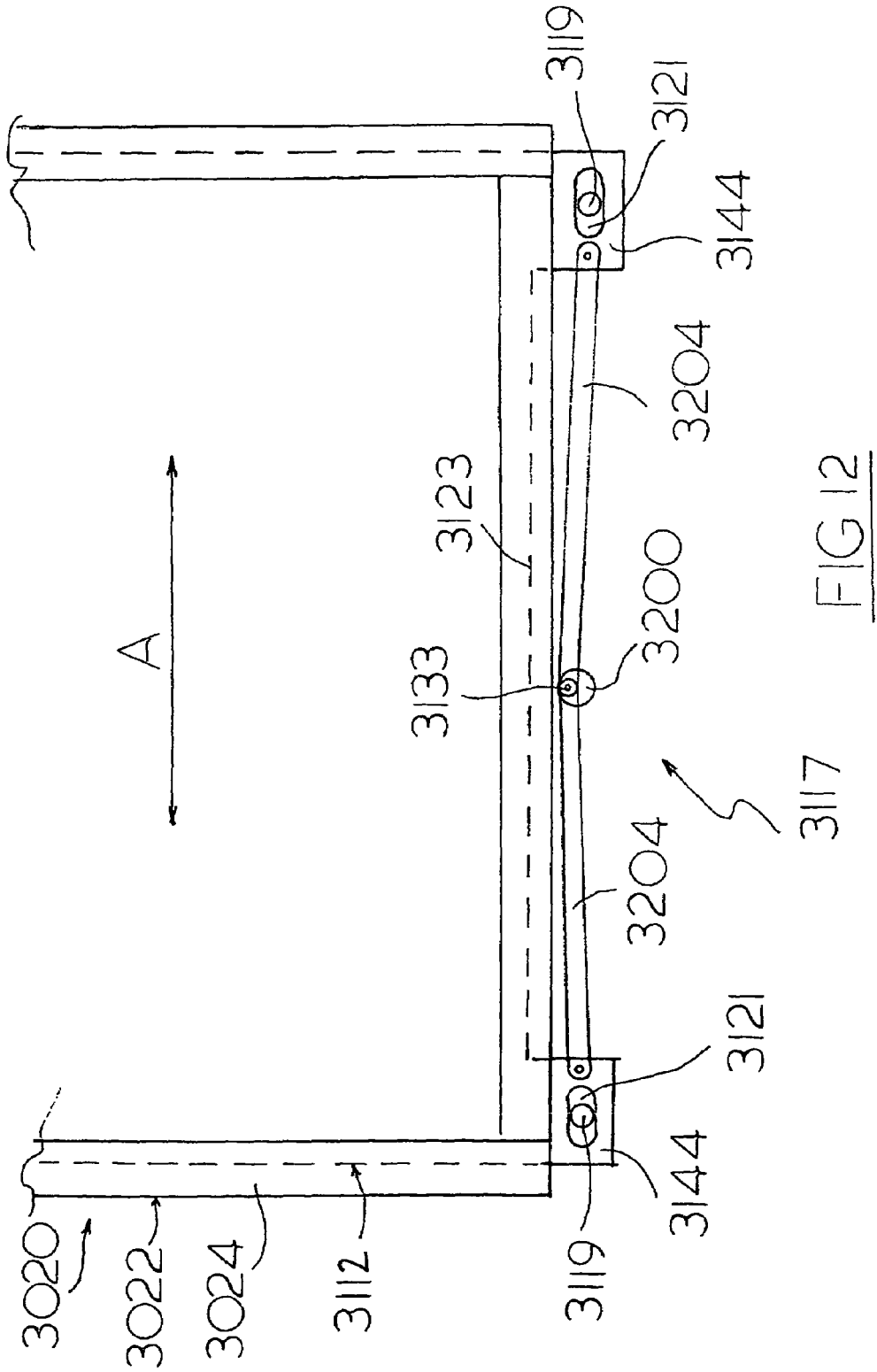
FIG. 12 is a front view of part of a still further embodiment of a display apparatus according to the invention, in which an alternative drive mechanism is provided.
Figure 13:
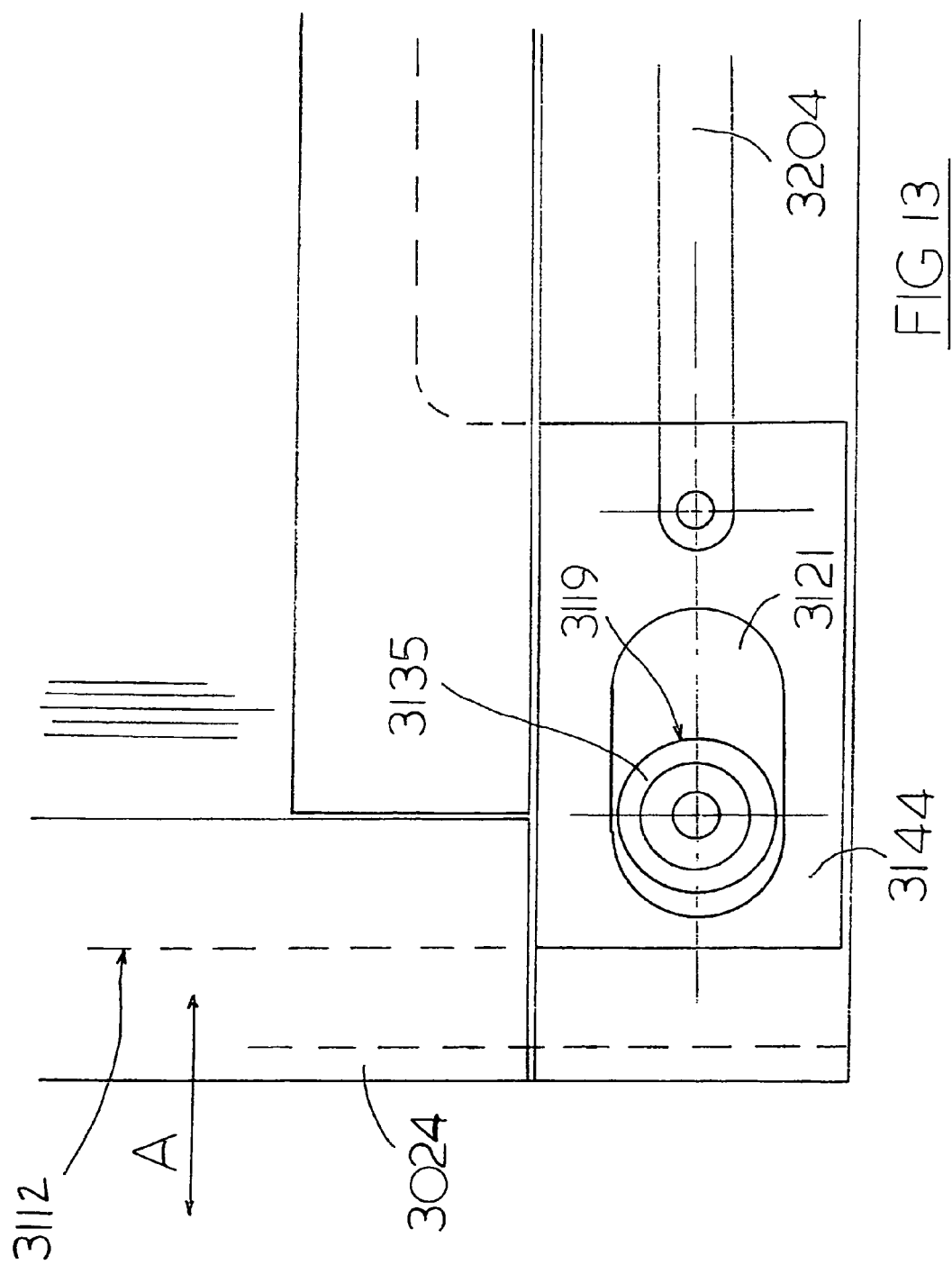
FIG. 13 is a close up view of part of a drive mechanism used in the embodiment of FIG. 12.
Figure 14:
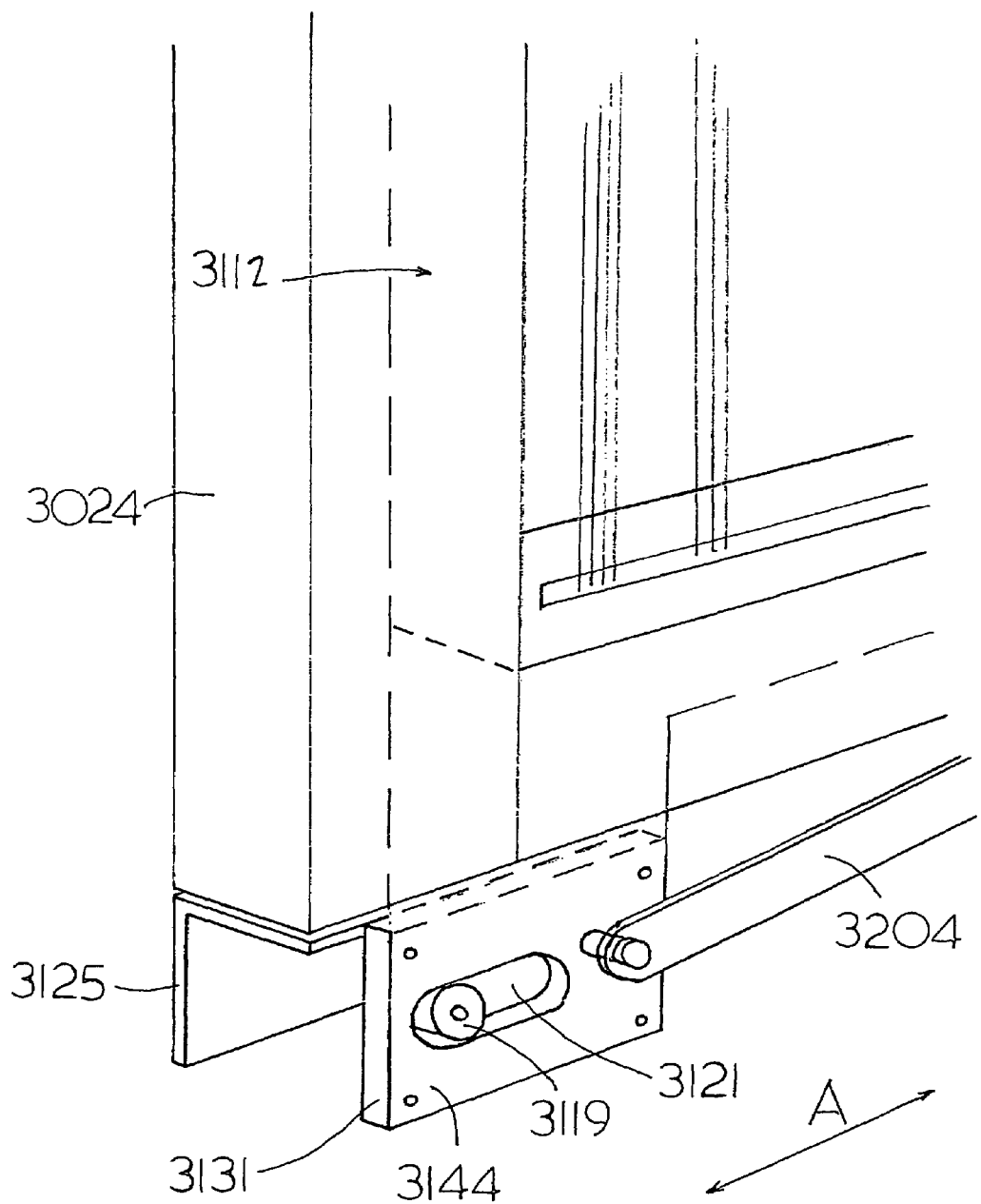
FIG. 14 is a perspective view of the mechanism of FIG. 13.
Figure 15:
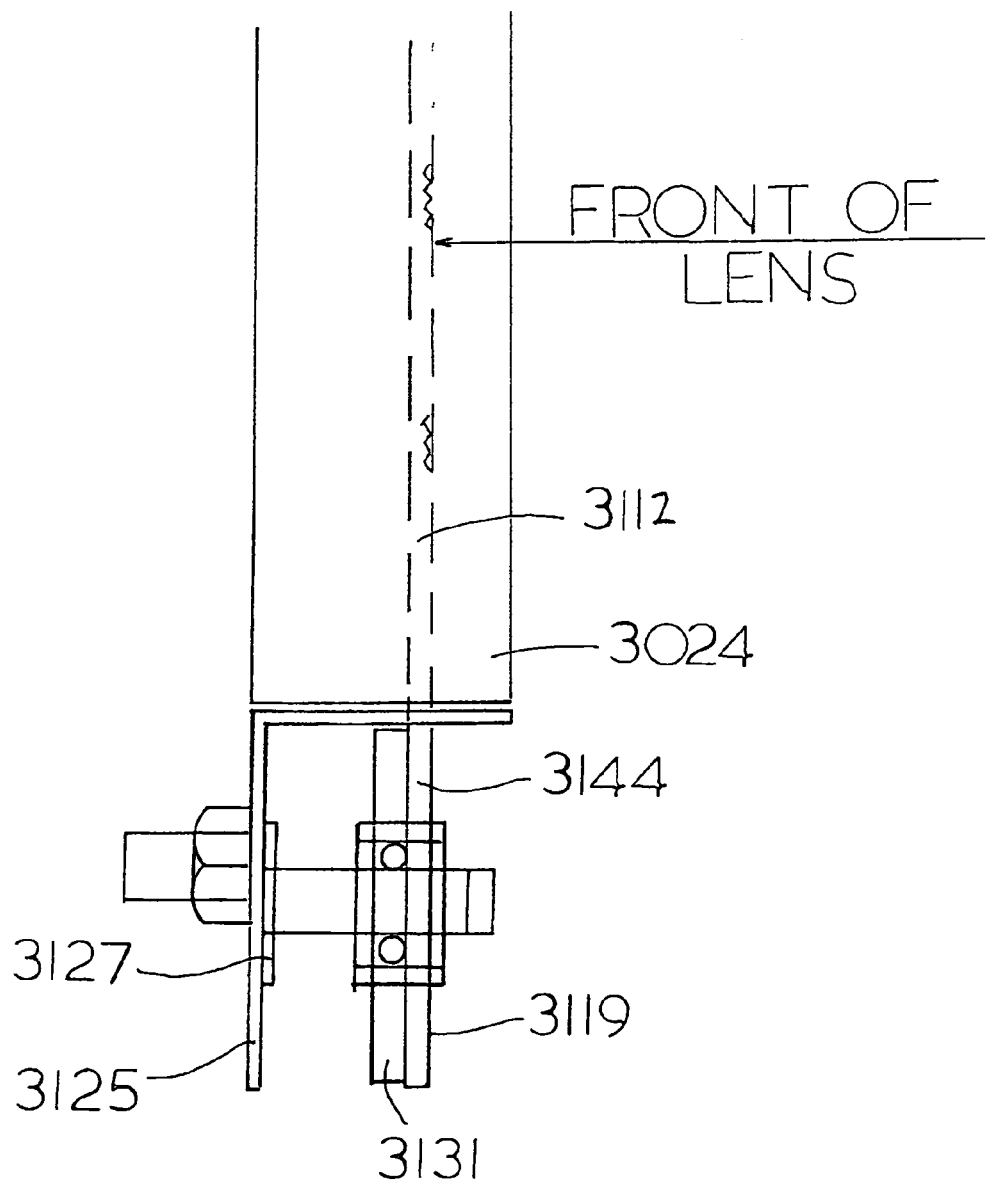
FIG. 15 is a side view of the mechanism of FIGS. 13 and 14.

Referring now to FIGS. 12 to 16, only part of the display apparatus 3020 is shown (the non-illustrated parts of apparatus 3020 may be generally similar to one or more of the previously described embodiments). The lens sheet 3112 includes two spaced apart lugs 3144 which preferably project beyond the frame 3024 and are preferably located at or adjacent opposite ends of the lens sheet 3112 (but preferably on the same side, as shown in FIG. 12). A respective bearing slot 3121 is formed in each lug 3144, the slots 3144 extending in a direction substantially parallel with the desired direction of movement of the lens sheet (as indicated by arrow A). A respective support bearing 3119 is located in each bearing slot 3121. Preferably, each support bearing 3119 comprises a roller bearing. The support bearings 3119 may be fixed with respect to the apparatus 3020 by any suitable means. For example, with reference to FIGS. 14 and 15, one or more support brackets 3125 may be fixed to the frame 3124 and arranged to carry the support bearings 3119. Preferably, the location of one or both support bearings 3119 is adjustable in a direction generally perpendicular with the direction A. This may be achieved in any convenient manner. For example, each bearing 3119 may be mounted on a respective cam 3127 (only one shown), each cam being eccentrically mounted on a bracket 3125. By rotating the respective cam the respective bearing 3119 is moved up or down (as viewed in FIGS. 12 to 16). This allows the orientation of the lens sheet 3112 to undergo tilt adjustment as described with reference to FIGS. 10 and 11. As may best be seen from FIG. 14, it is preferred that a rigid plate 3131, e.g. of metal, is fixed to each lug 3144 to provide rigidity and reinforcement.

The actuating means, or drive mechanism 3117 comprises a rotating member, e.g. in the form of a cam 3200 rotatably mounted, and preferably eccentrically mounted, on the frame 3124 (e.g. via bracket 3125). The arrangement is such that the cam 3200 is located between the lugs 3144, preferably substantially at the midpoint between the lugs 3144. In use, the cam 3200 is driven by a rotary motor (not shown) which may also be mounted on the bracket 3215. A respective lever 3204 is coupled between the cam 3200 and the respective lugs 3144 (either directly (as shown) or indirectly via a respective cam follower). In the preferred embodiment, each lever 3204 has one end pivotably mounted to a common connection point 3133 which is off-centered on the cam 3200. The respective other end of each lever 3204 is pivotably mounted to a respective lug 3144. In use, rotational movement of the cam 3200 causes levers 3204 to impart reciprocating movement to the lens sheet 3112 in the direction indicated by arrow A. The movement of the lens sheet 3112 is guided by the sliding engagement between the slots 3121 and the respective bearings 3119. The provision of rollers 3135 on the bearings 3119 helps to ensure smooth movement of the lens sheet 3112.

The extent of the reciprocating movement of the lens sheet 3112 is determined by the location of the common connection point 3133 on the cam 3200. In the preferred embodiment, the levers 3204 may be connected to one of a plurality of connection points, each connection point being located at a respective different distance from the centre of the cam 3200. This allows the extent of movement, or travel, of the lens sheet 3112 to be adjusted.

Figure 16:
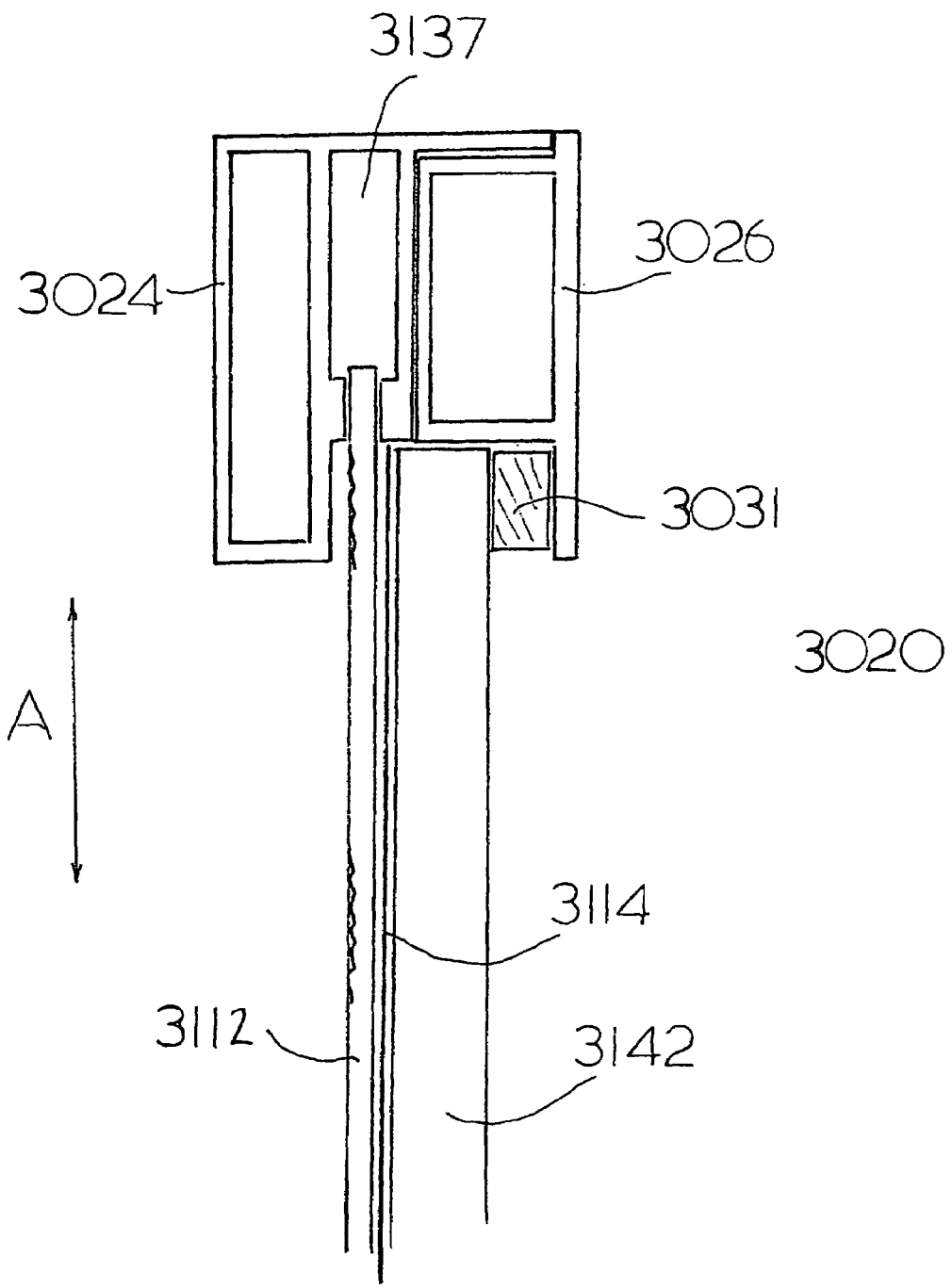
FIG. 16 is an end view of part of the apparatus of FIG. 12.

FIG. 16 shows an end view of the apparatus 3020 and illustrates the lens sheet 3112, the image sheet 3114, backing plate 3142, padding/pressure component 3031 and frames 3024, 3026, all being generally similar arrangement to the previously described embodiments. It will be seen that the frame 3024 is shaped to provide a gap 3137 to allow movement of the lens sheet 3112 in direction A.

Figure 17:
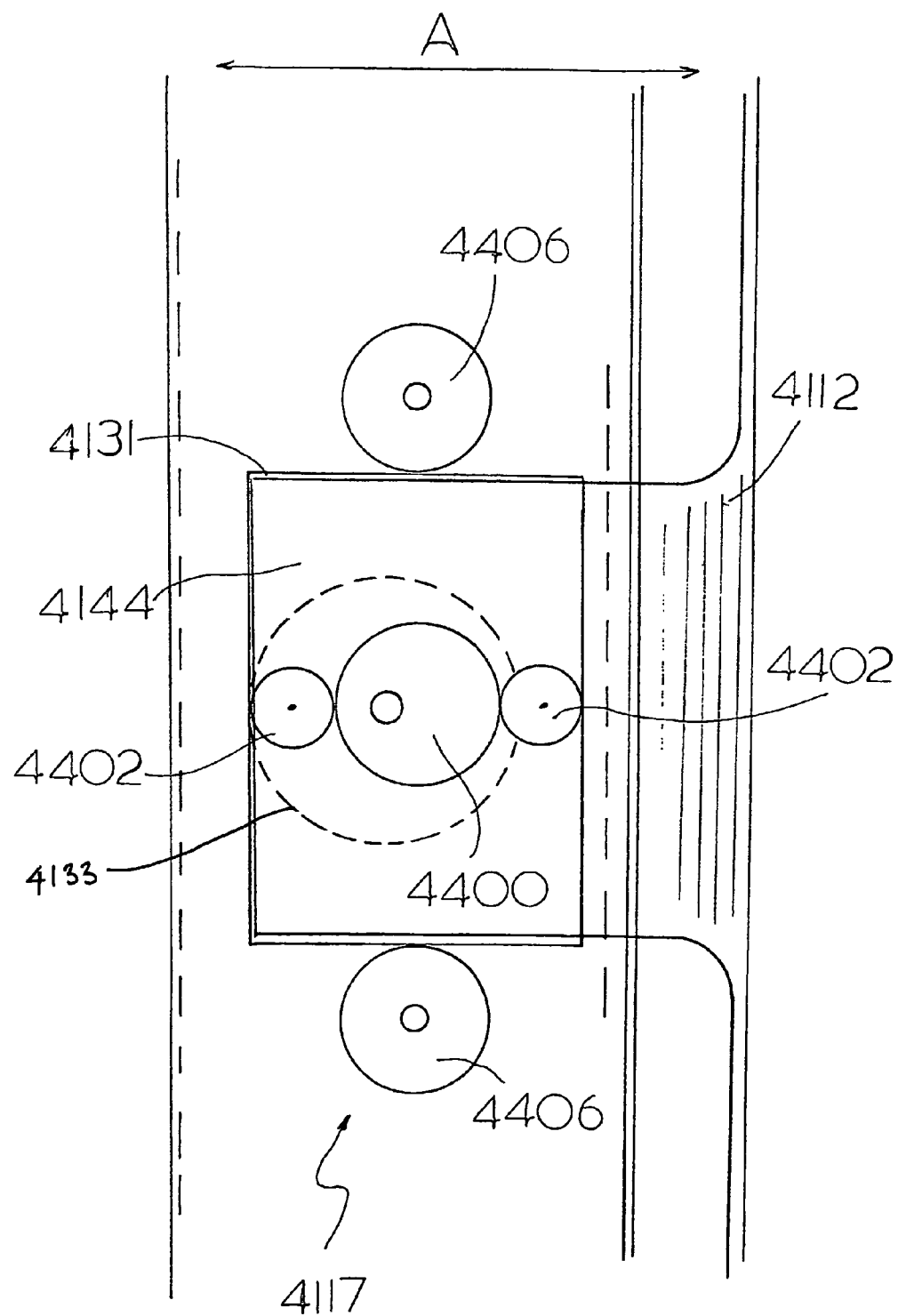
FIG. 17 is a front view of part of another embodiment of a display apparatus according to the invention, in which a further alternative drive mechanism is provided.
Figure 18:
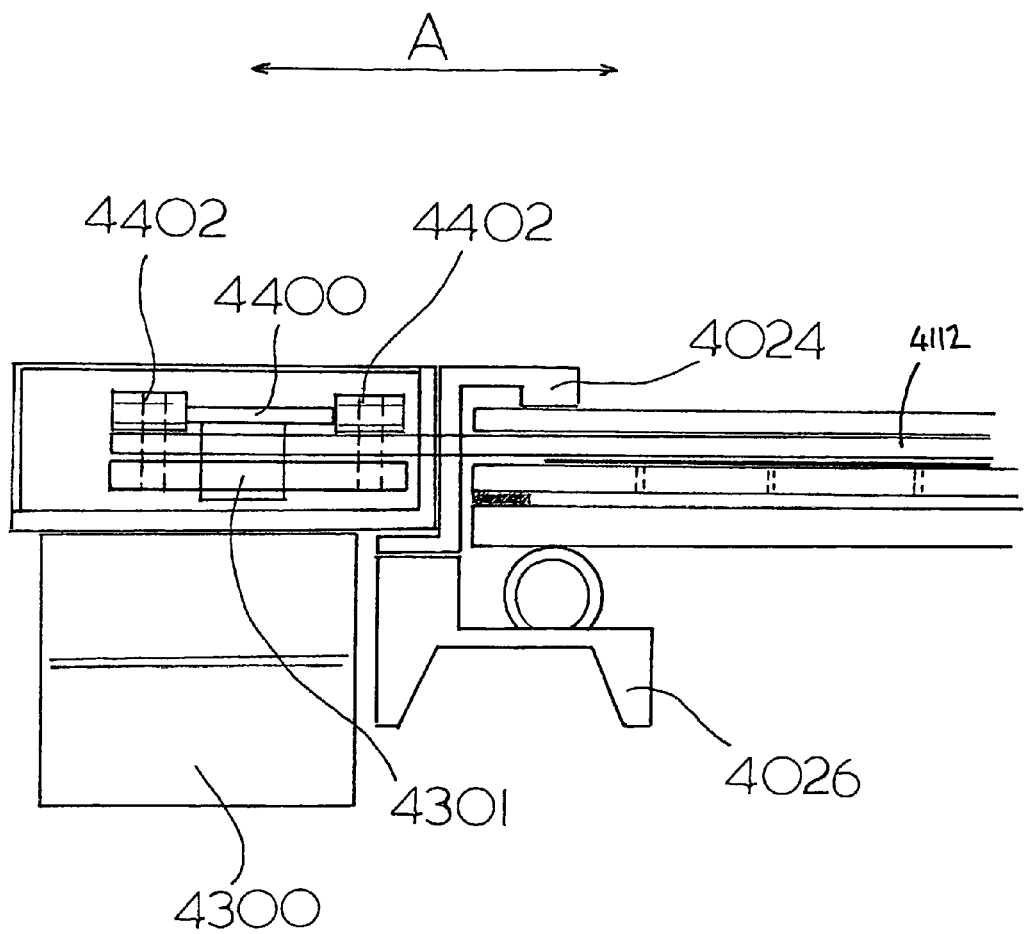
FIG. 18 an end view of the drive mechanism and part display apparatus of FIG. 17.
Figure 19:
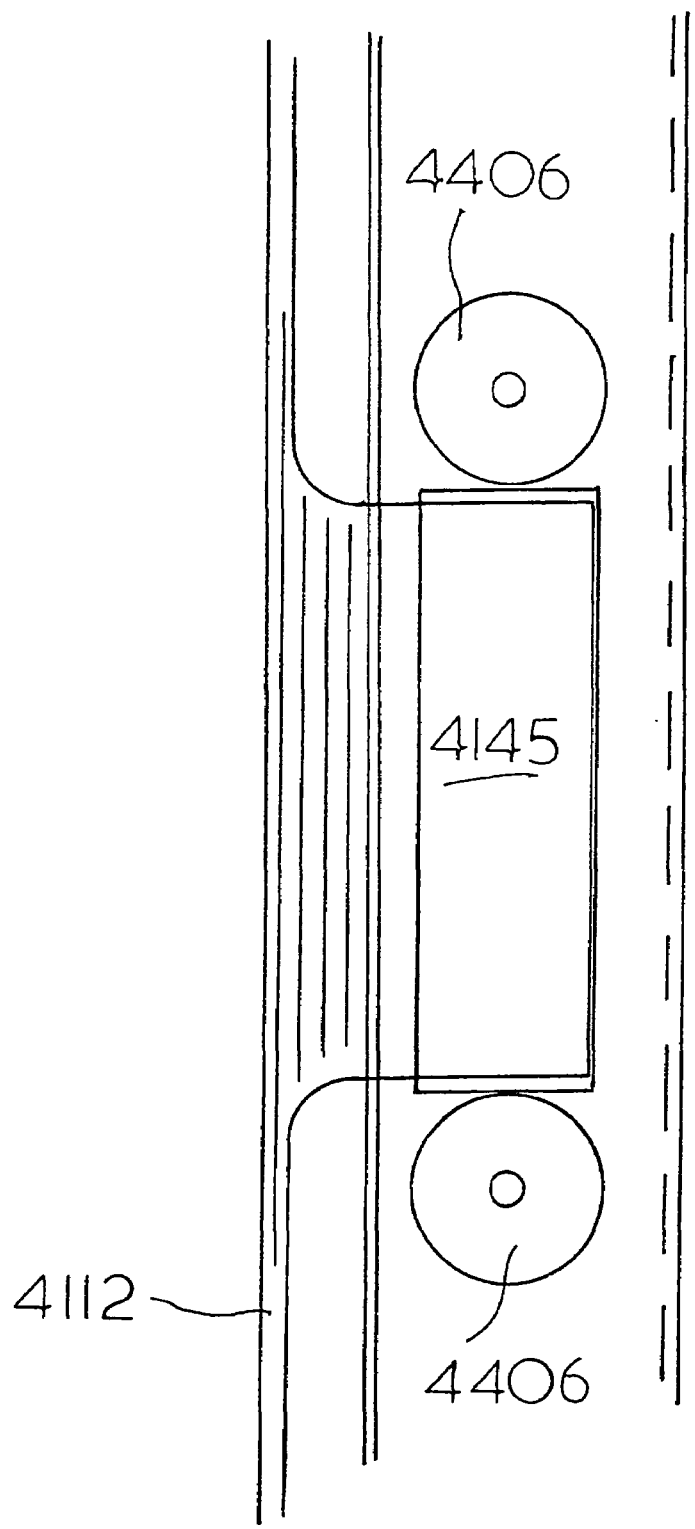
FIG. 19 is a front view of another part of the display apparatus of FIG. 17, said other part being oppositely located on the display apparatus to said drive mechanism.
Figure 20:
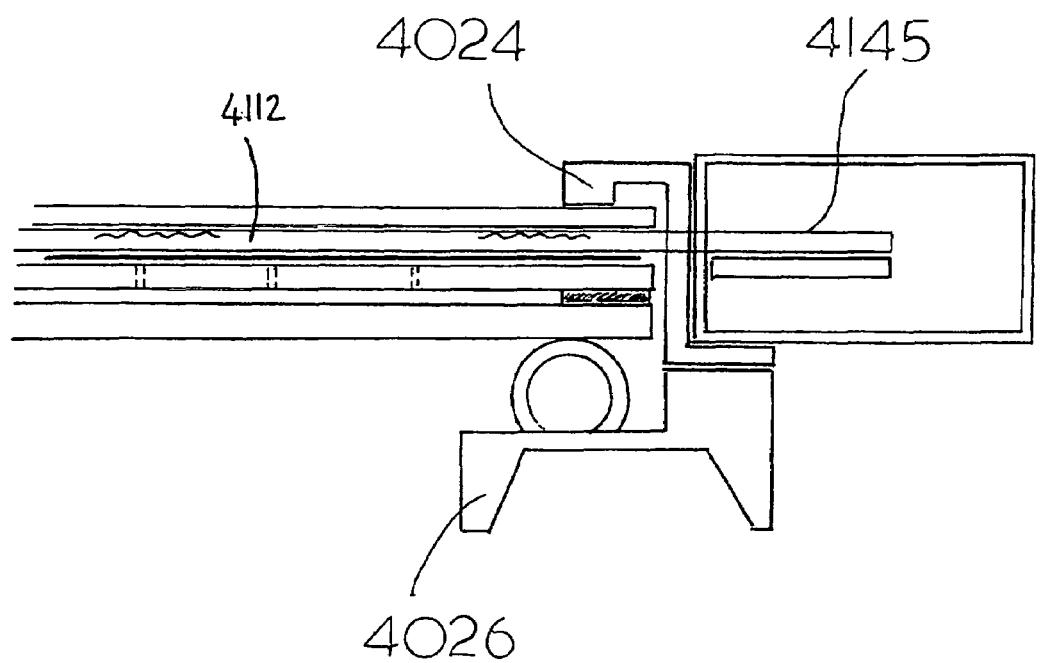
FIG. 20 is an end view of the display apparatus part shown in FIG. 19.

Another embodiment of a display apparatus 4020 having actuating means or a drive mechanism 4117 is presented in FIGS. 17 to 20. FIGS. 17 and 18 show different views of one side of the apparatus 4020, while FIGS. 19 and 20 show different views of the opposite side of the apparatus 4020. The display apparatus 4020 may be generally similar to the apparatus of previously described embodiments, with the exception of the drive mechanism 4117, as is described hereinafter. Hence, the description and drawings of the previous embodiments may be applied to the apparatus 4020, particularly for aspects of the apparatus 4020 other than the drive mechanism 4117.

Referring now in particular to FIG. 17, only part of the display apparatus 4020 is shown (the non-illustrated parts of apparatus 4020 may be generally similar to one or more of the previously described embodiments). The lens sheet 4112 includes two lugs 4144, 4145 (one is shown in FIG. 17, the other being shown in FIG. 19) which project beyond the frame 4024 (see FIGS. 18 and 20) and are preferably located at or adjacent opposite sides of the lens sheet 4112. Most preferably, each lug 4144, 4145 is located at approximately the midpoint of its respective side of the lens sheet 4112.

The drive mechanism 4117 comprises a motor 4300 (FIG. 18), preferably of the type having a rotary output shaft 4301, a cam 4400 in operative association with at least one cam follower 4402. In the illustrated embodiment, there are two cam followers 4402, generally oppositely disposed on either side of the cam 4400, although other numbers and arrangements of cam followers 4402 may be used. For example (as with other embodiments) a single cam follower may be used to cause the lens sheet to be actuated in one direction against the action of resilient biasing means, e.g. a spring, the biasing means subsequently actuating the lens sheet in the opposite direction. The cam followers 4402 are connected to, or coupled to, the lug 4144. During use, the cam 4400 is rotated by the motor 4300 about an axis 4404. The association between the cam 4400 and the cam followers 4402 is such that rotation of the cam 4400 causes reciprocating movement of the cam followers 4402 in the general direction indicated by arrow A in FIGS. 17 and 18 (i.e. a direction that is generally in the plane in which the lens sheet 4112 lies and generally perpendicular with the longitudinal axes of the lenses). To this end, the cam 4400 has a generally circular cam surface for engagement with the cam followers 4402 and is preferably eccentrically mounted on, or coupled to, the shaft 4301 of the motor 4300 such that the axis 4404 is off-centre with respect to the cam 4400. Alternatively, the cam surface may be selected to effect reciprocating movement of the cam followers 4402. The cam followers 4402 may have a respective generally circular cam follower surface for engagement with the cam 4400. The lug 4144 of FIGS. 17 and 18 may be referred to as the driven lug 4144. In an alternative embodiment, only the driven lug 4144 need be provided.

To provide mechanical support to the lugs 4144, 4145, one or both of the lugs 4144, 4145 may be provided with a respective reinforcing member, for example in the form of a plate 4131. The driven lug 4144, and preferably also the non-driven lug 4145 (FIG. 19), are supported (directly or indirectly) by bearing means, for example in the form of one or more roller bearings 4406. In the preferred embodiment, the driven lug 4144 is supported by at least one roller bearing 4406 (or other bearing device) on opposite sides of the lug 4144 (the sides being opposite with respect to the axis of movement of the lens sheet 4112). In use, this may mean that one (or more) bearing 4406 is above the lug 4144, while the oppositely disposed bearing(s) 4406 are below the lug 4144. Hence, as the lens sheet 4112 is reciprocated in the direction A, the driven lug 4144 runs between, and is supported by, or guided by, the bearings 4406. This serves to guide the lens sheet 4112 such that is reciprocating movement is consistent and is as close as possible to the desired direction of movement. It is preferred that the non-driven lug 4145 is similarly associated with bearings 4406, as shown in FIG. 19. It will be seen from FIGS. 17 and 19, that in the illustrated embodiment, the lugs 4144, 4145 themselves do not actually engage with the bearings 4406. Rather, the respective reinforcing plates 4131 engage with the bearings 4406.

A housing 4201 or support frame is provided for receiving the driven lug 4144 and the associated parts of the drive mechanism 4117 (FIG. 18). The motor 300 is conveniently carried by the housing 4201. The housing 4201 may be fixed to the frame 4024 or 4046 in any convenient manner or may simply be located adjacent the frames 4024, 4026. Similarly, a housing 4201 may be provided to receive the non-driven lug 4145 (FIG. 20).

FIG. 18 shows an end view of the apparatus 4020 (e.g. from above as viewed in FIG. 17) and illustrates the lens sheet 4112, the image sheet 4114, backing plate 4142, padding/pressure component 4031 and hinged frames 4024, 4026, all of which may be generally similar in nature and arrangement to the corresponding features of the previously described embodiments, although alternative arrangements may be used. It will be seen that the frame 4024 is shaped to provide a gap 4137 on each side through which a respective lug 4144 extends during use.

As may best be seen from FIG. 18, the shaft 4301 of the motor 4300 passes through the lug 4144 and plate 4131 by means of an aperture 4133. This is a preferred space-saving arrangement.

The arrangement illustrated in, and described with reference to, FIGS. 17 to 20 is particularly suited to situations where the apparatus 4020, and in particular the lens sheet 4112, is relatively large. Relatively large (and therefore relatively heavy) lens sheets 4112 can be difficult to move in a reciprocatory manner that is sufficiently smooth to display lenticular images satisfactorily. The apparatus 4020, and in particular the drive mechanism 4117, enables a sufficiently smooth movement of the lens sheet 4112 to be effected.

In preferred embodiments, the lens sheet is actuatable by drive means with a rotary output, a rotatable cam (preferably a cam mounted eccentrically on its axis of rotation) and preferably one or more cam followers which, together, impart reciprocating motion to the lens sheet. The drive means is preferably operable at a substantially constant rate and so that cam is operable at a substantially constant rate. Moreover, it will be apparent that the preferred actuating mechanisms described herein locate, or position, and reciprocate the lens sheet such that the lenses exactly in register with the corresponding image portions on the image sheet when the lens sheet is at rest (even momentary rest).

The invention is not limited to the embodiments described herein which may be modified or varied with departing from the scope of the invention.

The invention claimed is:

1. An apparatus for displaying a lenticular image comprising a lenticular image sheet and a lenticular lens sheet, the apparatus comprising a housing adapted to receive the lenticular image sheet and lenticular lens sheet so as to allow relative sliding movement between the image sheet and lens sheet in a direction substantially perpendicular to the longitudinal axes of lenses on the lens sheet, the apparatus including means for actuating one of said lenticular lens sheet and said lenticular image sheet in said direction of movement, wherein at least one lug projects from said one of the lens sheet or image sheet, the apparatus further including at least one bearing arranged to support said at least one lug during said relative sliding movement.

2. An apparatus as claimed in claim 1, wherein said actuating means is arranged to actuate said lens sheet, the image sheet being, at least during use, fixed with respect to the housing.

3. An apparatus as claimed in claim 2, wherein the actuating means comprises a rotary cam in operative association with at least one cam follower such that rotation of the cam causes reciprocating movement of the at least one cam follower, the at least one cam follower being coupled to the lens sheet to impart reciprocating movement thereto.

4. An apparatus as claimed in claim 3, wherein said at least one lug projects from said lens sheet in a direction substantially parallel with said direction of movement, said at least one cam follower being carried by said at least one lug.

5. An apparatus as claimed in claim 4, wherein said at least one lug carries two spaced apart cam followers, the cam being located, in use, between the cam followers.

6. An apparatus as claimed in claims 4, wherein said cam has a rotational axis, the cam being eccentrically mounted on said rotational axis.

7. An apparatus as claimed in claims 4, wherein a single lug projects from a first side of the lens sheet and is substantially centrally located on said first side.

8. An apparatus as claimed in claim 7, wherein a single lug projects from a second side of the housing, the second side being opposite the first side.

9. An apparatus as claimed in claim 1, wherein at least one of said bearings is rotatable about an axis and is eccentrically located with respect to said axis.

10. An apparatus as claimed in claim 2, wherein said at least one lug projects from the lens sheet in a direction generally perpendicular with the direction of movement of the lens sheet and is generally coplanar with the lens sheet.

11. An apparatus as claimed in claim 10, wherein said at least one lug is associated with guide means in the form of a slot and pin assembly, one of the slot and pin being provided on said at least one lug, the other being carried by the housing.

12. An apparatus as claimed in claim 11, wherein the position of said pin is adjustable in a direction generally perpendicular with the direction of movement of the lens sheet and generally in or parallel with the plane in which the lens sheet lies.

13. An apparatus as claimed in claim 1, further including means for tilting the lens sheet about an axis generally perpendicular with the plane in which it lies.

14. An apparatus as claimed in claim 13, wherein said tilting means comprises one or more support members which, in use, support the lens sheet, the position of or each support member being adjustable in a direction generally perpendicular with the direction of movement of the lens sheet and generally in or parallel with the plane in which the lens sheet lies.

15. An apparatus as claimed in claim 1, wherein the position of at least one of said at least one bearing is adjustable in a direction generally perpendicular with the direction of movement of the lens sheet and generally in or parallel with the plane in which the lens sheet lies.

16. An apparatus as claimed in claim 15, wherein at least one of said at least one bearing is rotatable about an axis and is eccentrically located with respect to said axis.

17. An apparatus as claimed in claim 1, wherein said actuating means is coupled to said at least one lug to effect said relative sliding movement.

18. An apparatus as claimed in claim 2, wherein said actuating means comprises a rotatable member coupled to at least one lever, said at least one lever being coupled to the lens sheet to effect reciprocating movement of the lens sheet upon rotation of the rotatable member.

19. An apparatus as claimed in claim 2, wherein said at least one lug projects from said lens sheet in a direction substantially parallel with said direction of movement.

* * * * *